United States Patent
Cartwright

(10) Patent No.: US 11,013,168 B2
(45) Date of Patent: *May 25, 2021

(54) METHOD AND SYSTEM FOR PROVIDING SOIL ANALYSIS

(71) Applicant: Floratine Products Group, Inc, Collierville, TN (US)

(72) Inventor: Timothy B. Cartwright, Collierville, TN (US)

(73) Assignee: Floratine Products Group, Inc, Collierville, TN (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/446,977

(22) Filed: Jun. 20, 2019

(65) Prior Publication Data

US 2019/0357427 A1 Nov. 28, 2019

Related U.S. Application Data

(63) Continuation of application No. 15/501,419, filed as application No. PCT/US2015/052947 on Sep. 29, 2015, now Pat. No. 10,368,481.

(Continued)

(51) Int. Cl.
| | |
|---|---|
| *A01G 2/00* | (2018.01) |
| *A01G 7/00* | (2006.01) |
| *A01C 21/00* | (2006.01) |
| *G06Q 30/06* | (2012.01) |
| *G06Q 50/02* | (2012.01) |
| *A01G 22/00* | (2018.01) |

(52) U.S. Cl.
CPC .............. *A01C 21/007* (2013.01); *A01G 2/00* (2018.02); *A01G 7/00* (2013.01); *A01G 22/00* (2018.02); *G06Q 30/0631* (2013.01); *G06Q 50/02* (2013.01)

(58) Field of Classification Search
CPC ............... A01G 2/00; A01G 7/00; A01G 7/04
USPC ............ 47/1.01 R, 17, 48.5, 58.1 R, 58.1 SC
See application file for complete search history.

(56) References Cited

U.S. PATENT DOCUMENTS 4,992,942 A * 2/1991 Bauerle .................. A01G 31/00
700/284
5,870,689 A * 2/1999 Hale .................... A01B 79/005
702/5

(Continued)

*Primary Examiner* — David J Parsley
(74) *Attorney, Agent, or Firm* — Veritay Group, IP PLLC; Susan B. Fentress

(57) ABSTRACT

The present disclosure describes a system, method, and non-transitory computer readable medium for analyzing soil samples. Accordingly, soil sample units may be obtained and provided to a server that generates raw data. The raw data is sent to a database, where it is downloaded. The raw data is subsequently organized into a sub-report for each nutrient or variable contained in the raw data. An average for each nutrient in the raw data and a number of additional factors related to the raw data may be calculated. The average and additional factors are used to determine bulk recommendations by comparing target data to an exchangeable measured value. Additionally, the factors are also used to determine challenges and solutions by comparing the average data to the target data for each nutrient. The system compares the raw data to the measured values and mathematically adjusts the compared values to compute an optimal treatment algorithm.

20 Claims, 20 Drawing Sheets

Related U.S. Application Data

(60) Provisional application No. 62/056,757, filed on Sep. 29, 2014.

(56) References Cited

U.S. PATENT DOCUMENTS

| | | | | |
|---|---|---|---|---|
| 5,878,371 | A * | 3/1999 | Hale | A01C 7/105 |
| | | | | 702/5 |
| 6,141,614 | A * | 10/2000 | Janzen | A01B 79/005 |
| | | | | 172/2 |
| 6,505,146 | B1 * | 1/2003 | Blackmer | A01B 79/005 |
| | | | | 340/991 |
| 6,751,576 | B2 * | 6/2004 | Hall | G01J 3/28 |
| | | | | 356/328 |
| 8,055,562 | B2 * | 11/2011 | Gugaliya | G06Q 40/12 |
| | | | | 705/35 |
| 9,113,590 | B2 * | 8/2015 | Johnson | A01B 79/005 |
| 9,489,576 | B2 * | 11/2016 | Johnson | G01C 11/04 |
| 9,668,420 | B2 * | 6/2017 | Anderson | A01D 41/1271 |
| 10,368,481 | B2 * | 8/2019 | Cartwright | G06Q 30/0631 |
| 2006/0074560 | A1 * | 4/2006 | Dyer | G06Q 50/02 |
| | | | | 702/5 |
| 2015/0040473 | A1 * | 2/2015 | Lankford | A01G 25/16 |
| | | | | 47/58.1 SC |

* cited by examiner

Nutrients & Variables Evaluated

| Nutrient or Variable | Lab Procedure |
|---|---|
| Traditional Albrecht or Exchange ||
| Calcium, ppm | Ammonium Acetate |
| Magnesium, ppm | Ammonium Acetate |
| Potassium, ppm | Ammonium Acetate |
| Sodium, ppm | Ammonium Acetate |
| Phosphorus, ppm | Bray 1 or Olsen depending on the pH |
| Iron, ppm | DTPA |
| Manganese, ppm | DTPA |
| Zinc, ppm | DTPA |
| Copper, ppm | DTPA |
| Boron, ppm | DTPA/Sorbitol |
| Organic matter, % | Furnace at 600 deg C |
| CEC | Calculation |
| pH | Digital pH probe (10 replicates) |
| Soluble Salts | Calculation |
| Ca-PBS | Calculation |
| Mg-PBS | Calculation |
| K-PBS | Calculation |
| Na-PBS | Calculation |
| H-PBS | Calculation |
|  |  |
| Soluble or Available Nutrition ||
| Saturation Index | Calculation based on OM and CEC |
| Electrical Conductivity | Soil EC (1:1) |
| Calcium, ppm | Soluble Paste Test |
| Magnesium, ppm | Soluble Paste Test |
| Potassium, ppm | Soluble Paste Test |
| Sodium, ppm | Soluble Paste Test |
| Ammonium, ppm | KCl Extraction |
| Nitrate, ppm | Soluble Paste Test |
| Sulfate, ppm | PO4 Extraction |
| Chloride, ppm | Soluble Paste Test |
| Phosphorus, ppm | Soluble Paste Test |
| Bicarbonate, ppm | Soluble Paste Test |
| Estimated Nitrogen Release (ENR) |  |
| Estimated Phosphorus Release (EPR) |  |

FIG. 3A

| | |
|---|---|
| Iron, ppm | Soluble Paste Test |
| Manganese, ppm | Soluble Paste Test |
| Zinc, ppm | Soluble Paste Test |
| Copper, ppm | Soluble Paste Test |
| Boron, ppm | Soluble Paste Test |
| Silicon, ppm | Silica Extraction |
| Cation Ratios-Soluble or Available Nutrients | |
| Calcium % | Calculation |
| Magnesium, % | Calculation |
| Potassium, % | Calculation |
| Sodium, % | Calculation |
| Ammonium, % | Calculation |
| Anion Ratios-Soluble or Available Data | |
| Nitrate, % | Calculation |
| Sulfate, % | Calculation |
| Chloride, % | Calculation |
| Phosphorus, % | Calculation |
| Bicarbonate, % | Calculation |
| | |
| Target Lines | Calculation |
| | |
| Comments | Sorted & presented |
| | |
| Bulk Recommendations | Calculation |
| | |

FIG. 3B

| Laboratory Number | | AQ17991 | | Avg. | Target |
|---|---|---|---|---|---|
| Client ID | | Good | | | |
| Organic Matter % | | 0.9 | | 0.9 | 1.2 |
| Saturation Index | | 0.8 | | 0.8 | 1 |
| pH | | 7.7 | | 7.7 | 6 |
| Buffer pH | | | | | |
| Soluble Salts | | 0.2 | | 0.2 | 0.3 |
| Electrical Conductivity | | 0.53 | | 0.53 | 1.6 |
| Excess Carbonates | | L | | | |
| Calcium (Ca) | TOTAL PPM | 1096 | | 1096 | 1600 |
| | AVAILABLE PPM | 36 | | 36 | 67 |
| Magnesium (Mg) | TOTAL PPM | 203 | | 203 | 317 |
| | AVAILABLE PPM | 13 | | 13 | 38 |
| Ca:Mg Ratio | | 5.4 | | 5.4 | |
| Potassium (K) | TOTAL PPM | 111 | | 111 | 93 |
| | AVAILABLE PPM | 11 | | 11 | 33 |
| Sodium (Na) | TOTAL PPM | 57 | | 57 | 25 |
| | AVAILABLE PPM | 32 | | 32 | 34 |
| Cation Exchange Capacity | | 7.7 | | 7.7 | 11 |
| Percent Base | Ca % | 71.1 | | 71.1 | 57.7-65.3 |
| Saturations | Mg % | 22 | | 22 | 13.7-21.7 |
| | K % | 3.7 | | 3.7 | 6.9-8.7 |
| | Na % | 3.2 | | 3.2 | 1.5-2.0 |
| | H % | 0 | | 0 | 5.0-8.0 |
| Phosphorus (P) | TOTAL PPM | 19 | | 19 | 12 |
| (Olson) | AVAILABLE PPM | 2.7 | | 2.7 | 4.4 |
| EPR | lb/acre | 11 | | 11 | |

FIG. 11C

| | | | |
|---|---|---|---|
| Sulfur (S) | AVAILABLE PPM | 9.4 | 10 |
| Chloride (Cl) | AVAILABLE PPM | 26 | 48 |
| Bicarbonate (HCO₃) | AVAILABLE PPM | 85 | 84 |
| Nitrate (NO₃) | AVAILABLE PPM | 16 | 9.3 |
| Ammonium (NH₄) | AVAILABLE PPM | 3.6 | 12 |
| ENR | lb / acre | 74 | |
| Iron (Fe) | TOTAL PPM | 13 | 57 |
| | AVAILABLE PPM | 1.4 | 3.5 |
| Manganese (Mn) | TOTAL PPM | 0.6 | 3.3 |
| | AVAILABLE PPM | 0.04 | 0.35 |
| Zinc (Zn) | TOTAL PPM | 5.7 | 1.5 |
| | AVAILABLE PPM | 0.05 | 0.1 |
| Copper (Cu) | TOTAL PPM | 3.4 | 3.2 |
| | AVAILABLE PPM | 0.04 | 0.14 |
| Boron (B) | AVAILABLE PPM | 0.78 | 0.58 |
| Silicon (Si) | AVAILABLE PPM | 25 | 37 |
| Sand % | | | |
| Silt % | | | |
| Clay % | | | |
| Texture | | | |

| Bulk Recommendations | | lb/acre |
|---|---|---|
| Calcium (Ca) | | 1096 |
| Magnesium (Mg) | This is the quantity required to achieve balance and overcome nutrient tie-ups. | 244 |
| Potassium Oxide (K₂O) | The amount required may not be economically feasible in a short time period. | 51 |
| Potassium Pentoxide (P₂O₅) | | 0 |

FIG. 11C (Cont.)

METHOD AND SYSTEM FOR PROVIDING SOIL ANALYSIS

CROSS REFERENCE TO RELATED APPLICATIONS

This application is a divisional patent application of US Ser. No. 15/501,419 filed Feb. 2, 2017 which is a § 371 National Stage Application of PCT/US15/52947 application filed Sep. 29, 2015, which claims the benefit of U.S. provisional patent application No. 62/056,757 filed Sep. 29, 2014 (hereby specifically incorporated herein by reference).

The current technology relates to providing a consistent and accurate soil analysis for increasing crop yield.

BRIEF SUMMARY OF THE INVENTION

The present technology relates to a system and method for analyzing soil samples to determine appropriate treatments. An embodiment of the present technology includes a method for generating a recommendation to increase yield for an agricultural crop. That method comprises, in part, receiving, by one or more processors, a total measurement of a nutrient contained in a soil sample. The one or more processors also receive an estimate of an amount of the nutrient available in solution to be absorbed by roots of the agricultural crop from the soil sample. The one or more processors also receive a type of the agricultural crop. The one or more processors select, from a plurality of threshold values a first threshold value for the total measurement and a second threshold value for the estimate based on the type of the agricultural crop.

The one or more processors compare the total measurement to the first threshold value and compare the estimate to the second threshold value. The one or more processors generate a combination recommendation to increase yield for the agricultural crop type based on the comparisons and providing, by the one or more processors, the combination recommendation for display. In one embodiment, when the total measurement of the nutrient is less than the first threshold value, generating the combination recommendation includes generating a recommendation to add a foliar fertilizer. When the estimate is less than the first threshold value, generating the combination recommendation includes generating a recommendation to add a soil fertilizer. In another embodiment, the nutrient is an anion and may be selected from the group consisting of phosphorus (P); sulfur (S); chloride (Cl) and bicarbonate ($HCO_3$). The nutrient may also be selected from the group consisting of a base cation, nitrogen, and a micronutrient. In other embodiments, the measurement, and/or estimate may be received from a sensor system.

In another embodiment, the one or more processors in the method may receive a second total measurement of a second nutrient contained in the soil sample and may also receive a second estimate of an amount of the second nutrient available to be absorbed by the roots of the agricultural crop. In this embodiment, generating the combination recommendation is further based on the second total measurement and the second estimate.

In another embodiment, the method may also comprise selecting from the plurality of threshold values a third threshold value for the second total measurement and a fourth threshold value for the second estimate. In yet another embodiment, generating the combination recommendation is further based on a comparison of the third threshold value to the second total measurement and a comparison of the fourth threshold value to the second estimate. The combination recommendation may also include a specific recommendation for each of the total measurement, the estimate, the second total measurement, and the second estimate.

In another embodiment, the methods may also include ranking the specific recommendations based on predetermined ranking priorities for the agricultural crop, and generating the combination recommendation is further based on the ranking. The method may also comprise selecting the predetermined ranking priorities from a set of predetermined ranking priorities based on the agricultural crop type. Additionally, each threshold value of the plurality of threshold values may be associated with a particular agricultural crop type such that the plurality of threshold values corresponds to a plurality of different agricultural crop types.

The present technology may also include a system for generating a recommendation to increase yield for an agricultural crop. Among other things, the system comprises a memory storing a plurality of threshold values and one or more computing devices having one or more processors. The one or more processors may be configured to receive a total measurement of a nutrient contained in a soil sample, receive an estimate of an amount of the nutrient available to be absorbed by roots of the agricultural crop from the soil sample, and receive a type of the agricultural crop.

The one or more processors are also configured to select from the plurality of threshold values a first threshold value for the total measurement and a second threshold value for the estimate based on the type of the agricultural crop. The one or more processors are also specifically configured to compare the total measurement to the first threshold value and compare the estimate to the second threshold value. The one or more processors may be further configured to generate a combination recommendation to increase yield for the agricultural crop type based on the comparison, and provide the combination recommendation for display.

The one or more processors of the system are further configured to generate the combination recommendation by generating a recommendation to add a foliar fertilizer, when the total measurement of the nutrient is less than the first threshold value.

The one or more processors are further configured to generate the combination recommendation by generating a recommendation to add a soil fertilizer, when the estimate is less than the first threshold value.

In another embodiment, the nutrient or nutrients being analyzed may be an anion. That anion may be one of phosphorus (P); sulfur (S); chloride (Cl) and/or bicarbonate ($HCO_3$). The nutrient may also be a base cation, nitrogen, and/or a micronutrient.

The one or more processors of the present technology may further be configured to receive the total measurement and estimate from a sensor system.

In another embodiment, the one or more processors may be further configured to receive a second total measurement of a second soluble nutrient contained in the soil sample, and receive a second estimate of an amount of the second nutrient available to be absorbed by the roots of the agricultural crop. In such an embodiment, the one or more processors may be configured to generate the combination recommendation further based on the second total measurement and the second estimate.

The one or more processors may also be configured to select from the plurality of threshold values a third threshold value for the second total measurement and a fourth threshold value for the second estimate. The one or more processors may also be configured to generate the combination recommendation, wherein the recommendation is further based on a comparison of the third threshold value to the second total measurement and a comparison of the fourth threshold value to the second estimate. The combination recommendation includes a specific recommendation for each of the total measurement, the estimate, the second total measurement, and the second estimate.

The one or more processors may further be configured to rank the specific recommendations based on predetermined ranking priorities for the agricultural crop, and generate the combination recommendation further based on the ranking. The one or more processors are further configured to select the predetermined ranking priorities from a set of predetermined ranking priorities based on the agricultural crop type. The one or more processors are further configured to associate each threshold value of the plurality of threshold values with a particular agricultural crop type such that the plurality of threshold values correspond to a plurality of different agricultural crop types.

According to one example, the present disclosure describes a system for analyzing soil samples. The system may include physical sample units to collect, store and transport soil samples. The soil samples may be prepared with a test, such as the Albrecht test and/or a water extractable test. The raw data from these tests may be entered into a server that processes and/or stores the raw data, such as a list of nutrients and the quantities thereof. Once the raw data is generated, it may be sent to a database. The database may be stored in the first server, or at a location remote from the server.

Another server may download the raw data from the first server or the database to generate a sub-report for each nutrient in the raw data. The server may be of any type including a stand-alone server or a server located in a server farm or data center. The server may be one or more processors. The server then calculates the average for each nutrient in the raw data and calculates a number of factors related to the raw data. For example, the number of factors may include target data for each nutrient, an estimated nitrogen release (ENR), and an estimated phosphorus release (EPR), based on the raw data from the plurality of soil samples. These factors are used to determine bulk recommendations by comparing target data to an exchangeable measured value. Additionally, the servers are configured to calculate and predict solutions by comparing the average or actual data to the target data for each nutrient.

In other examples, the factors may be used to determine an anion ratio by comparing a first ratio to an optimal ratio and a cation ratio by determining a second ratio of each nutrient compared to other nutrients in the sample. Based on the above determinations, the server may provide a treatment recommendation.

According to another example, the present disclosure describes a method for providing soil analysis that includes receiving several soil samples. The method generates raw data from the soil samples using at least one test. This test may include an Albrecht test or a water extractable (solubility) test. Further, the raw data may include a list of nutrients and the quantities thereof in each of the several soil samples. The list of nutrients may include, but is not limited to calcium (Ca), magnesium (Mg), potassium (K), sodium (Na), phosphorus (P), sulfur (S), chloride (Cl), bicarbonate ($HCO_3$)), nitrate ($NO_3$), ammonium ($NH_4$), iron (Fe), manganese (Mn), zinc (Zn), copper (Cu), boron (B) and/or silicon (Si). The raw data is subsequently entered into a database.

The raw data is then downloaded from the database to another server where a sub-report may be generated for each nutrient in the raw data. Using the raw data, a number of factors, including the average of each nutrient, target or threshold data for each nutrient, an estimated nitrogen release (ENR), and an estimated phosphorus release (EPR), are calculated for each of the soil samples. These data points can be used by the one or more processors of the present technology to provide bulk and foliar treatment recommendations to increase crop yield.

BRIEF DESCRIPTION OF THE DRAWINGS

FIGS. 3A and 3B illustrate a table of the nutrients and variables evaluated during the soil analysis;

FIG. 11(c) illustrates a page from a display provided by the system.

DETAILED DESCRIPTION

One of the objectives of the current technology is to provide a consistent and accurate soil analysis for increasing crop yield or improving turf quality.

The present disclosure begins with providing users with submission forms and sample containers to obtain a plurality of samples. However, the method of soil collection may be of any type known to those of skill in the art. In this regard, samples may be collected from farms, sports venues, home lawns, etc., using the supplied submission forms and sample containers. The collected samples may then be submitted to a laboratory to generate raw data with regard to the collected soil samples. In this regard, laboratory personnel may prepare the samples using any of a variety of devices and/or well-known tests, such as the traditional Albrecht test (also known as "Exchangeable" or "Total") or the water extractable test (also known as "soluble paste" or "Available"). The laboratory equipment may generate a list of the nutrients and variables evaluated that may be included in a final report. The laboratory equipment may include one or more sensor systems for detecting one or more of the nutrients described herein. These nutrients will be discussed in greater detail below with respect to FIGS. 3A and 3B.

The laboratory may enter the raw data into a server or database. The system and method of the present technology may subsequently download the data to another server or set of servers. The raw data is then compiled, processed, and analyzed to generate information regarding the soil type, nutrient content, charge balance, saturation index, etc., of the soil samples. This information is compared to target information for the soil based on the location, climate, and expected (target) results. This target data may be stored on the system servers or network accessible databases. The system may then generate reports providing detailed information about the soil type, nutrient content, charge balance, saturation index, etc., which may be sent to the individual that submitted the samples. Additionally, the system may provide recommendations and custom tailored products based on the generated report to improve the overall quality of the soil. The recommendations may be based on correlations between crop yield or turf quality and a specific nutrient content.

Figure 1:
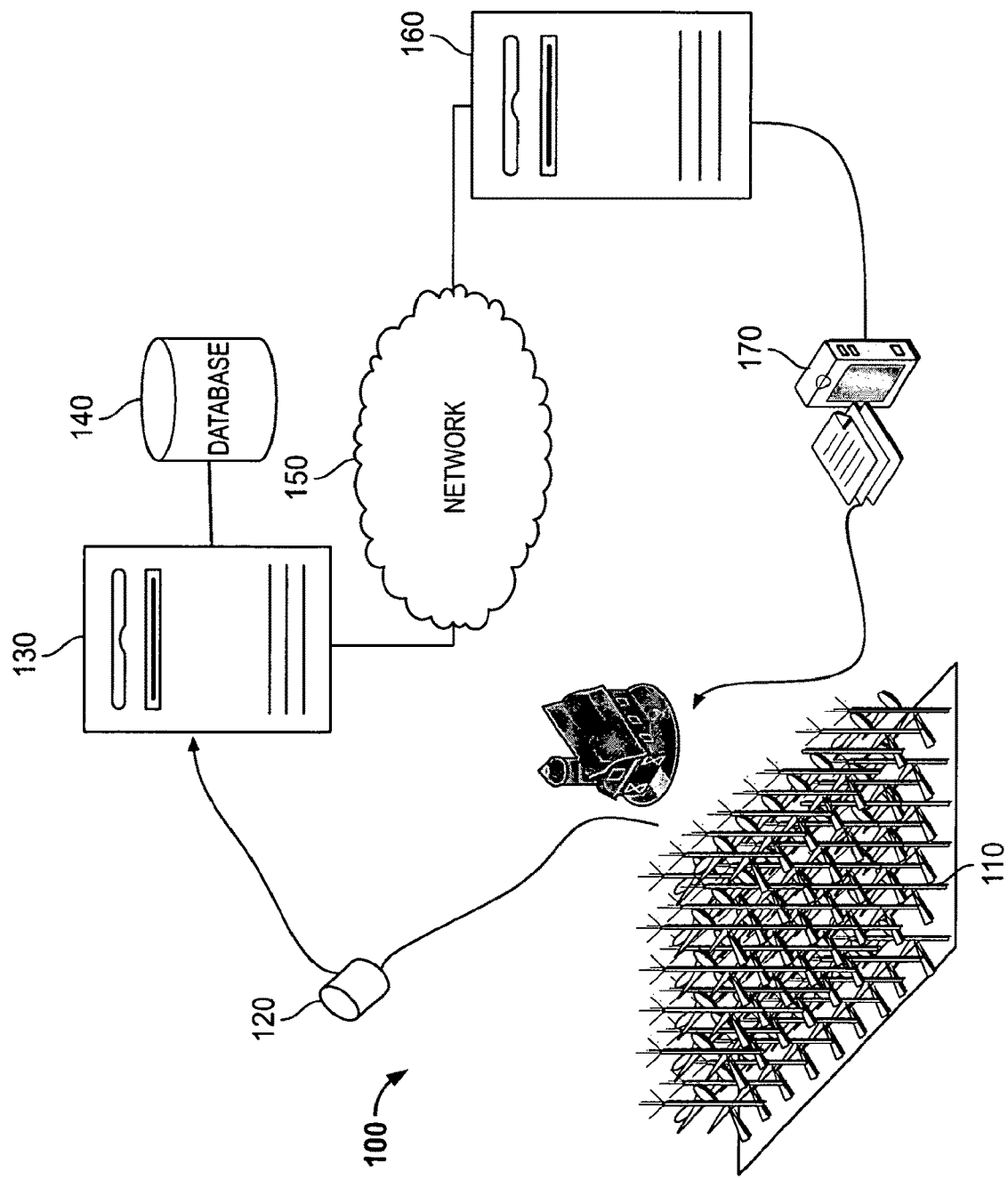
FIG. 1 illustrates an example of the system for providing soil analysis.

Turning to FIG. 1, a system 100 for providing a consistent and accurate soil analysis is shown. The system 100 includes a farm 110, at least one soil sample 120, a first server 130, a database 140, a network 150, a second server 160, and a treatment course 170.

The farm 110 may include a number of fields, each with a different crop. Accordingly, a farmer may take several soil samples from each field using supplied containers. One of ordinary skill in the art would recognize that the farmer may take several samples from different locations and/or at different depths of the same field. Alternatively, the farmer may take several samples from different fields. Further, while FIG. 1 illustrates the farm 110, one of ordinary skill in the art would recognize that the soil samples may be collected from a variety of locations, such as athletic fields (i.e., baseball, football, tennis), golf courses, homes (i.e. gardens and lawn), etc.

The soil sample 120 may be collected in any type of container that allows the farmer to collect at least one soil sample and transmit it for further processing. In this regard, the at least one soil sample 120 may include a bag or container, such as a vile or series of bottles, with soil samples as collected above.

The first server 130 may be operated by a laboratory or other facility that can conduct basic soil analysis to generate raw data with regard to the collected soil samples. In this regard, the first server 130 may include at least one processor, at least one memory, and laboratory equipment for measuring the soil parameters listed in FIGS. 3A and 3B. The processor and memory are in communication with one another. Further, the first server may include a plurality of servers or automated laboratory equipment.

The database 140 may be used to store the raw data generated by the first server 130. In this regard, the database 140 may include a table, SQL database, or any other known storage technique. Additionally, the database 140 may be located at the same facility as the first server 130. Alternatively, the database 140 may be accessed by the first server 130 via the network 150. In some examples, the database 140 may be co-located with the second server 160.

The network 150 may include any type of interconnected computer system that allows at least two devices to communicate with each other, such as a local area network (LAN), a wide area network (WAN), Ethernet, or the Internet. Additionally, the network 150 may be wired or wireless.

The second server 160 may be a soil analysis system. In this regard, the second server 160 may include at least one processor, at least one memory, and additional instructions and/or hardware for analyzing and downloading the raw data stored in the database 140. In another embodiment, the second server may be configured to automatically download the raw data from the first server.

Although the first server 130 and the second server 160 are described as separate systems capable of performing their own operations, one of ordinary skill in the art would recognize that the first server 130 and the second server 160 may be located in the same location. Alternatively, the functions of the first server 130 and the second server 160 may be performed by the same machine or cluster of servers.

The treatment course 170 may include a report containing the content of the soil sample and recommendations for improving the nutrient content of the soil sample based on the soil analysis performed by the server 160. Alternatively, the treatment course 170 may include a generated mix of chemicals for improving the nutrient content of the soil, including fertilizers, surfactants, oxidizers, etc. Additionally, the second server 160 may provide both the report and the generated mix of chemicals. The treatment course 170, may also include a system for automatically applying a generated mix of chemicals for improving the nutrient content of the soil.

Figure 2:
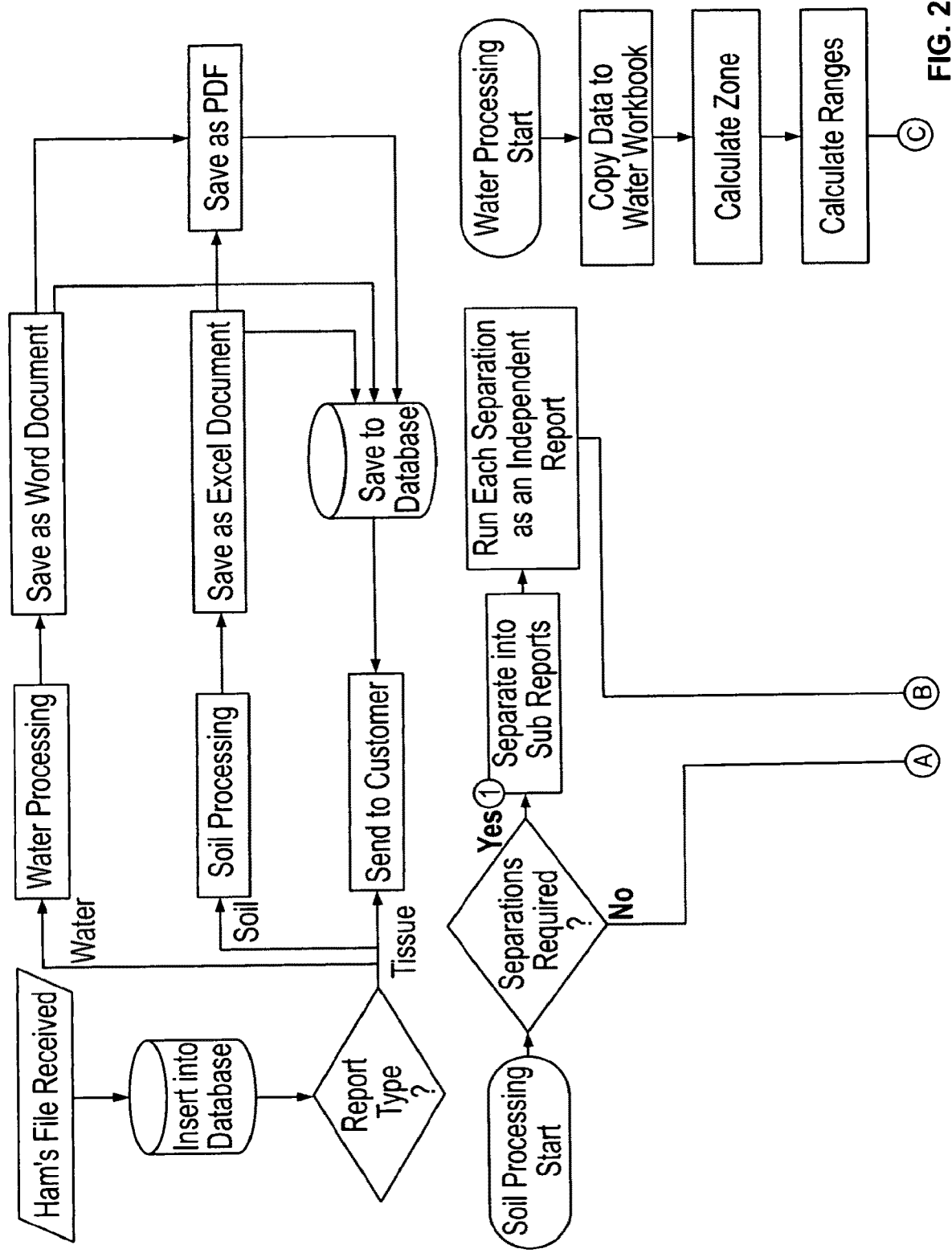
FIG. 2 shows a flowchart for analyzing the soil analysis.
Figure 2:
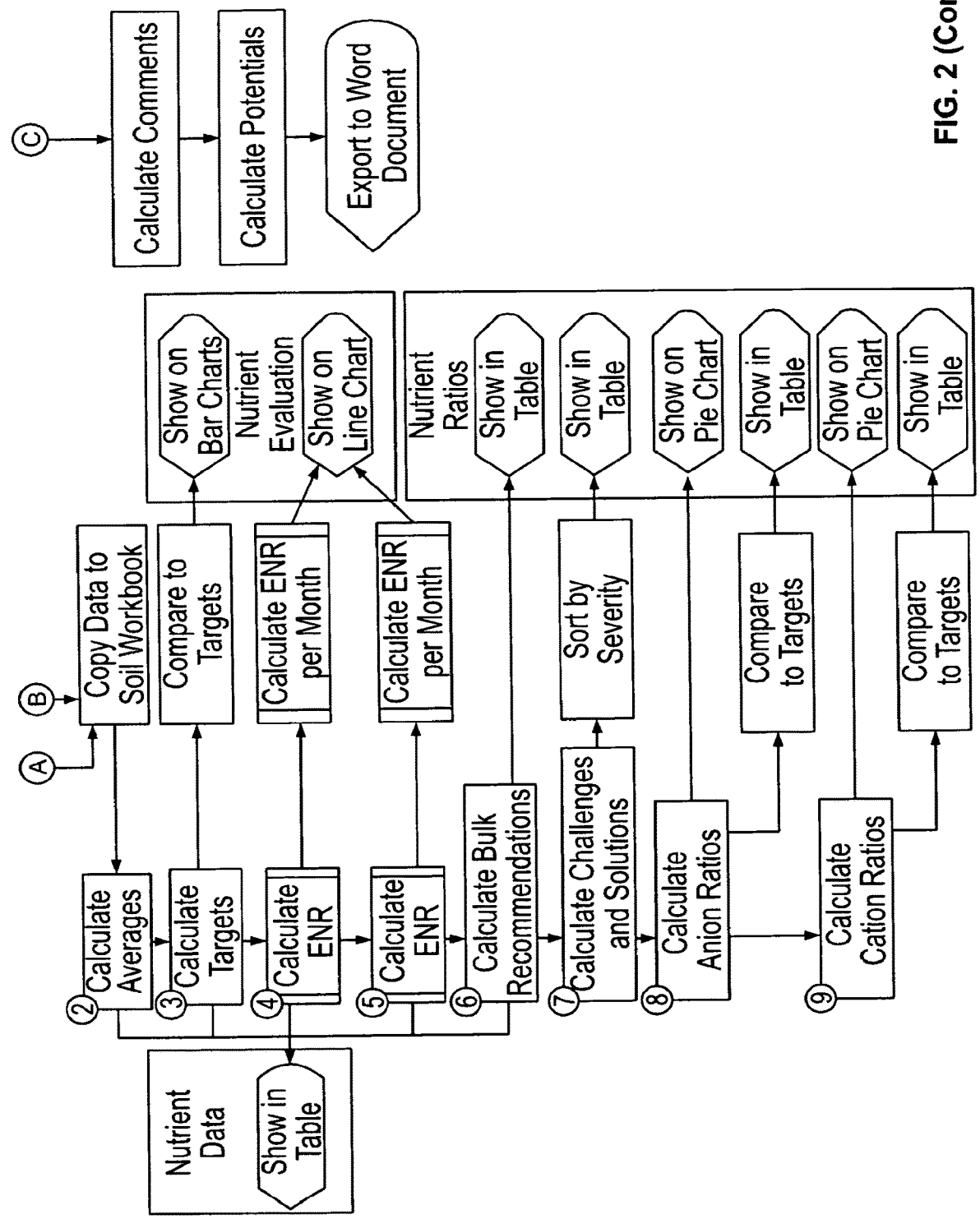

FIG. 2 illustrates a flowchart for providing a consistent and accurate soil analysis. As noted above, a user, such as a farmer or field superintendent, obtains at least one soil sample. The soil sample is provided to a laboratory to generate raw data with regard to the collected soil samples. The raw data may be generated by preparing the soil samples using a variety of devices, tests and techniques, such as an Albrecht test or a water extractable test. Albrecht Method, may preferably include the "Ammonium Acetate," "Bray" and "Olsen" procedures. The raw data may include a list of nutrients, such as calcium, magnesium, potassium, and phosphorus, and the quantities thereof contained in the soil sample.

The raw data generated by the tests may be entered into a file, which is stored in a non-transitory computer-readable medium, such as a database, a hard-drive, memory card, flash drive, ROM, RAM, DRAM, DVD or other optical disks, as well as other write-capable and read-only memories. From there, the file may be furthered processed in one or more processors, such as any conventional processor including multiple processors, multi-core processors, or a combination thereof, a dedicated controller, such as an application specific integrated circuit (ASIC), field programmable gate array (FPGA), etc. The processor may be contained in a server. The processor may be configured to analyze the file based on the raw data included in the report, such as the water content, the soil content, and the tissue content. The water content may be saved as a document to be provided to the customer. Additionally, the tissue content is reported to the customer for their reports. The soil content contained in the file may be subjected to additional soil processing.

When the file is subjected to additional soil processing, the processor may be configured to download the raw data from the database for additional processing. Accordingly, the server may then generate at least one sub-report by separating each variable (e.g., nutrients, organic matter, type of soil, etc.) in the raw data for each of the plurality of soil samples into sub-reports. For example, all samples with organic matter greater than 10 may have their analysis run independently of other samples. In another example, the samples may be separated into groups according to the following average deviation and in the following order:

pH: 1
organic matter: 0.75
exchangeable calcium: 400

In this regard, the samples may be separated into the smallest possible number of groups, such that the difference between the largest sample and the smallest sample is the smallest.

Next, the server may calculate averages for each sub-report. That is, the server may take the raw data and calculate the average for each nutrient in the soil samples. For example, if five samples from a five-acre corn field are submitted, the server will process all five samples to determine the average of each nutrient content across all five samples. Accordingly, the system may determine the average of nutrients such as Ca, Mg, K, Fe, P, etc. from the five samples taken from the five acre corn field.

Next the system may calculate target levels for each of the nutrients. That is, the system may determine what the optimum nutrient levels should be for a particular crop or turf type. The targets may be static numbers; however, some may be calculated on a sliding scale according to the averages. For example P, Ca, Mg, K, and Fe may be calculated on a sliding scale to give a realistic improvement goal recalculated by the servers in order to determine optimal yield. Additionally, certain targets may be set by other factors, such as the type of soil or the pH.

Additionally, the server may calculate an estimated nitrogen release (ENR) and/or an estimated phosphorus release (EPR). An ENR is a calculated estimate of how much nitrogen may be organically or naturally released into solution through a growing season. Similarly, EPR is a calculated estimate of how much phosphorus may be related through a growing season. These calculations may be used to help supplement treatment options based on the estimated loss of both nitrogen and phosphorus throughout the growing season.

After the content of the soil is determined based on the foregoing calculations, the server may calculate bulk recommendations based on the variables that effect the solubility of the nutrients. For example, the server may generate an estimation of bulk treatments to apply to the soil. Recommendations may be given, for example, for Ca, Mg, K, and P taking into account the target against the exchangeable measured values calculated above. In some examples, the Ca calculations may also take into account the sulfates and bicarbonates measured. Additionally, the calculations above may also take into account the ratio of Ca to Mg, K, and Na. In further examples, calculations related to Mg may also take into account the bicarbonates found in the soil. In another example, the K calculations may also take into account the Na found in the soil samples.

Next, the server may be configured to calculate challenges and solutions. For instance, each average may be given a ranking (e.g. low, optimal, or high) based on its difference from the target. For example, challenges may indicate low nutrients, poor soil quality, off-balance pH, etc. Additionally, the challenges and solutions may indicate deficient or excessive parameters. Accordingly, the ranking (or groups of rankings) may be used to determine if a challenge is applicable. The challenges may be given an urgency ranking (e.g., high, medium, or low). According to this example, the challenges may be sorted by urgency with the top challenges being listed in a report generated for the customer.

The server may also calculate anion ratios for the soil samples. The anion ratios may be the comparison between $HCO_3$, $NO_3$, $PO_4$, $SO_4$, and Cl. The anion ratios may be converted to a percentage and compared to optimal ratios stored on the server in order to determine the differences between the soil samples and the optimal soil content. This helps to provide recommendations for the user to improve their soil quality, thereby improving their yield. With respect to anions, the present systems and methods are configured to measure and analyze the available anion concentration, as well as determine if detrimental anions are present. For example, Phosphorus in the form of P or $PO_4$, Sulfur as $SO_4$ and N as $NO_3$ are known to be beneficial. Accordingly, if the beneficial anions are present, but deficient relative to the target for the particular crop, the system will make a recommendation to supplement those nutrients, either foliarly, or through the soil.

In contrast, anions such as chloride in the form of Cl and bicarbonate are known to be detrimental. Accordingly, if these detrimental anions are present in levels in excess of the target for a particular crop, the system generates a recommendation to remediate the excess. Remediation recommendations include but are not limited to stopping the input, adding a wetting agent to flush the anion, or adding a quantity of additional beneficial nutrients to offset the deleterious effects of the detrimental anion.

In addition to anion ratios, the server may also calculate cation ratios from the raw data. The cation ratios may be the relationship between Ca, Mg, K, Na, and $NH_4$. In this regard, the total ratios may simply be reported as PBS values. The available cation ratios may be converted to a percentage and reported to the client on the report. Additionally, the PBS may be to the client as a percentage compared to the optimal cation ratios.

Using the calculations above, the server may generate a report on a display. The report may indicate the soil content (e.g. nutrients, type of soil, pH balance) of the soil samples. Additionally, the report may contain the ratio of each nutrient in relation to other nutrients. This is an important consideration since trying to replace one nutrient may have an effect on other nutrients in the soil. Additionally, the report may include recommendations for improving soil content.

Turning to FIGS. 3A and 3B, a table of the nutrients and variables evaluated during the soil analysis process described above with respect to FIG. 2. For example, traditional systems compared nutrients and/or variables to Albrecht's standards. In contrast, the exemplary system and method described herein compare the nutrients and/or variables to specific crops and/or turf. In this regard, the system and methods described herein taken into account a myriad of additional factors, such as saturation index, electrical conductivity, water solubility, soil type, crop type, climate, latitude, longitude, soil pH, etc.

Additionally, the tables shoot in FIGS. 3A and 3B illustrate the use of a soluble paste test. The soluble paste test may also be used to establish yield correlations. Additionally, the system and method described herein may use a silica extraction test to help improve yield correlations.

Figure 4:
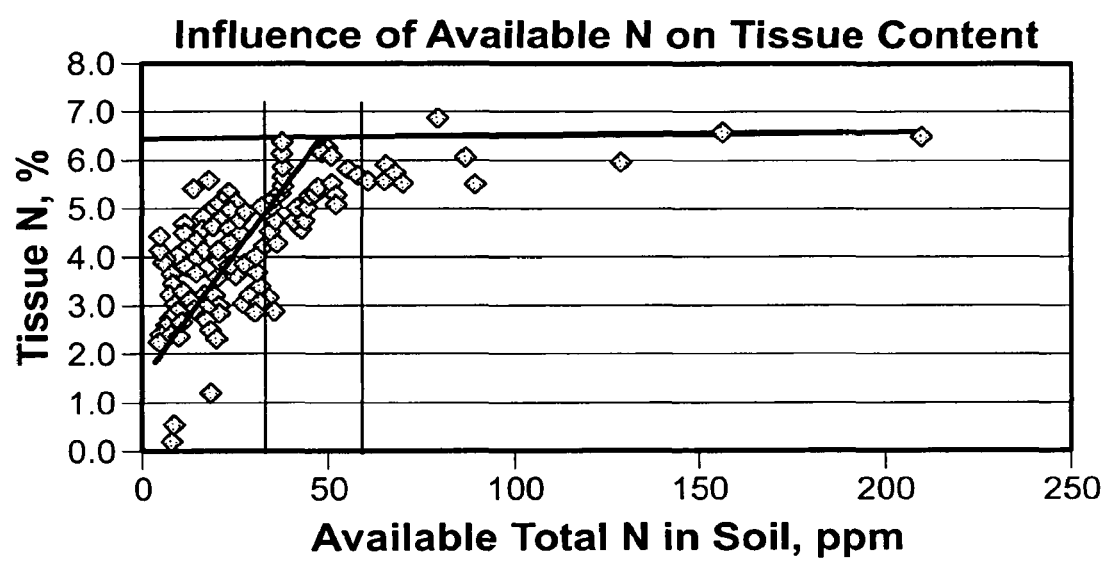
FIG. 4 illustrates a chart of nitrogen's influence on tissue content.

Referring to FIG. 4, a graph showing the influence of available soil nitrogen on tissue content. That is, FIG. 4 shows the maximum nitrogen content in grass tissue is maximum when the "available total N" in the soil is between 40 and 50 ppm. This allows users to minimize N run-off into waterways while reducing costs by eliminating over fertilizing.

Figure 5A:
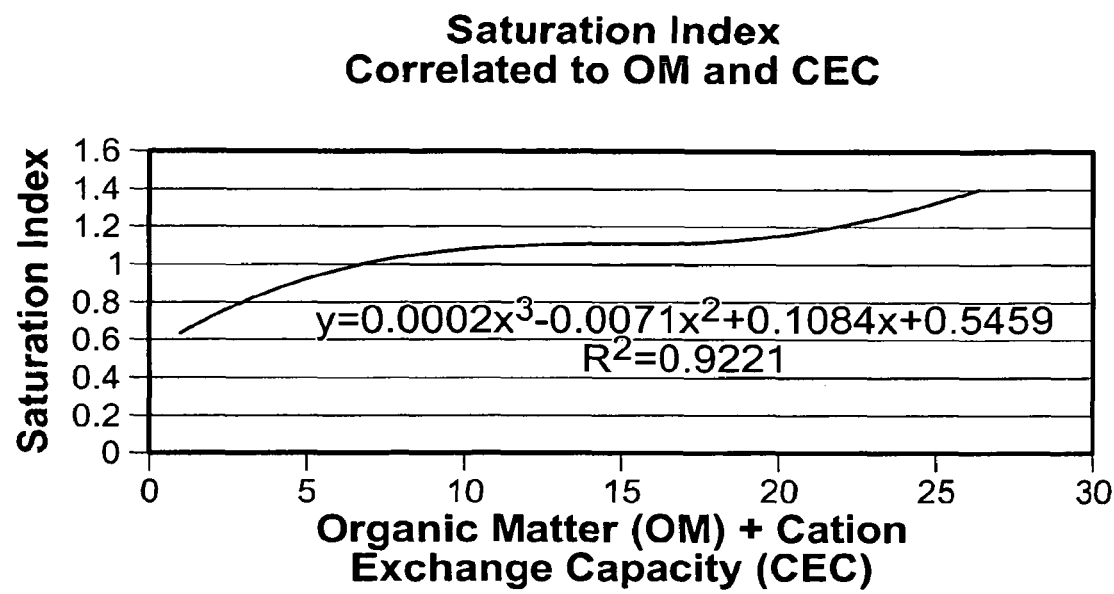
FIGS. 5A and 5B show the saturation index and the influence saturation index has on corn yield.

FIG. 5A shows a determination of the saturation index as it correlates to organic matter (OM) and cation exchange capacity (CEC). The saturation index is a unique parameter that gauges the soil's ability to allow water to drain. A lower number may mean the soil type is more like sand, while a high number represents a heavy or high clay soil. In this regard, the saturation index increases as OM and CEC increase, which allows a user to better predict and adjust his soil through tilling, aeration, wetting agents, etc.

Figure 5B:
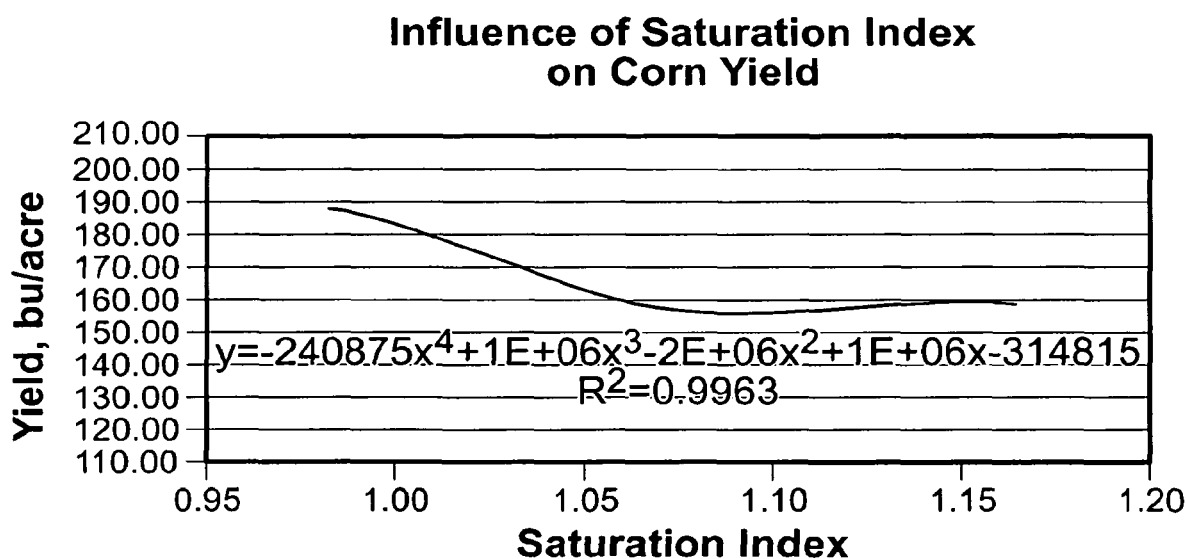

FIG. 5B illustrates the effect that determining the optimal saturation index for a crop has on its yield. According to this example, the saturation index for a field of corn was determined. As shown in FIG. 5B, the optimum saturation index for corn should be between 0.95 and 1.0. As noted above, determining the saturation index allows a user to better predict and adjust the soil through any physical or chemical technique known to those in the art.

Figure 6A:
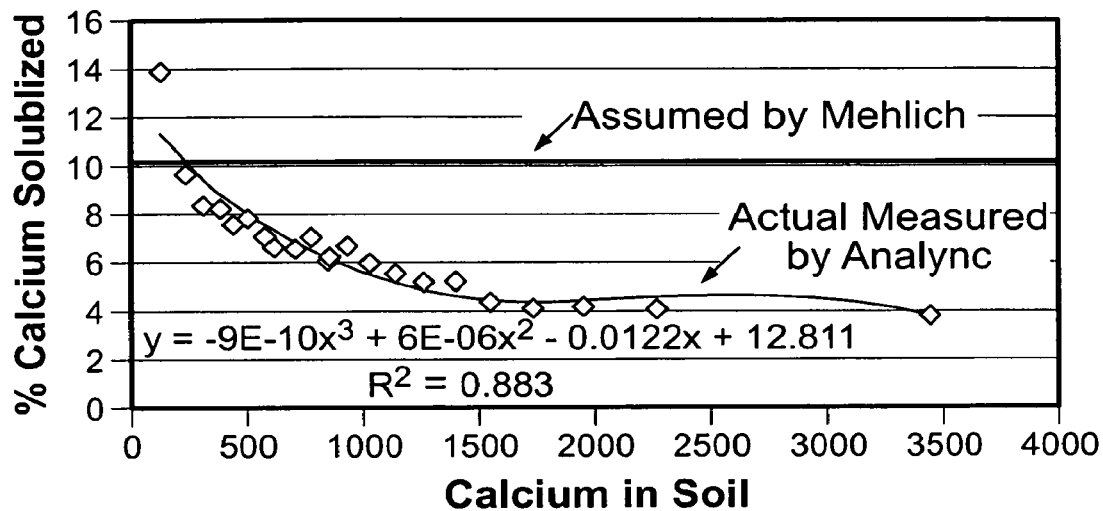
FIGS. 6A and 6B illustrates an example of the solubility of calcium.
Figure 6B:
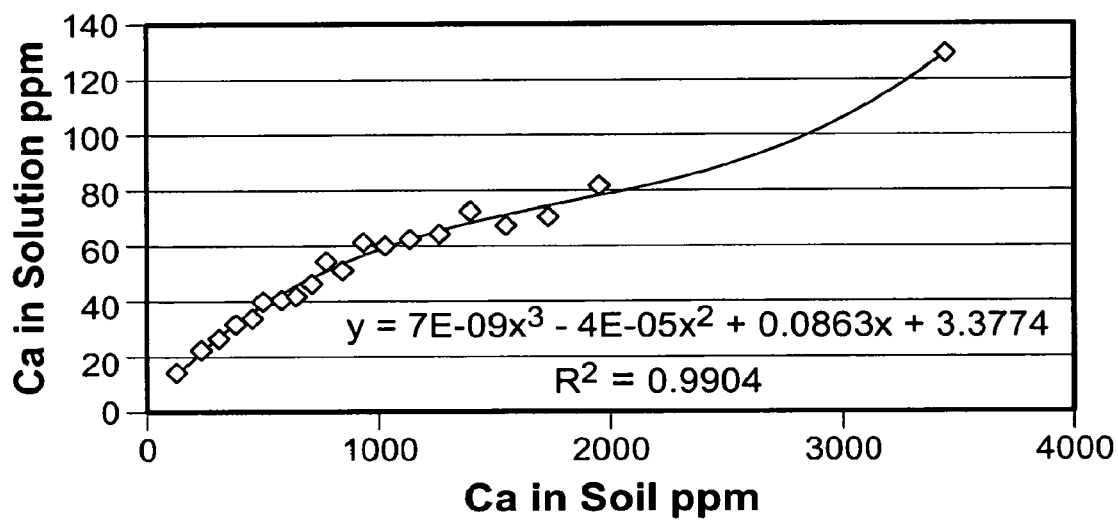

FIGS. 6A and 6B illustrate charts comparing the solubility of calcium as assumed by Mehlich and the solubility of calcium as determined by the methods and system described herein. In this regard, Mehlich Testing assumes solubility is constant for each nutrient. As shown, Mehlich assumed that 10% of Ca would be solubilized regardless of the Ca content of the soil. In contrast, in the present technology the percentage of Ca capable of being solubilized decreases as the arts per million of Ca in the soil increases. Thus, it appears that Ca solubility is directly related to the Ca content in the soil. In this regard, Ca solubility appears to plateau when the Ca in the soil reaches approximately 2000 ppm.

Figure 7A:
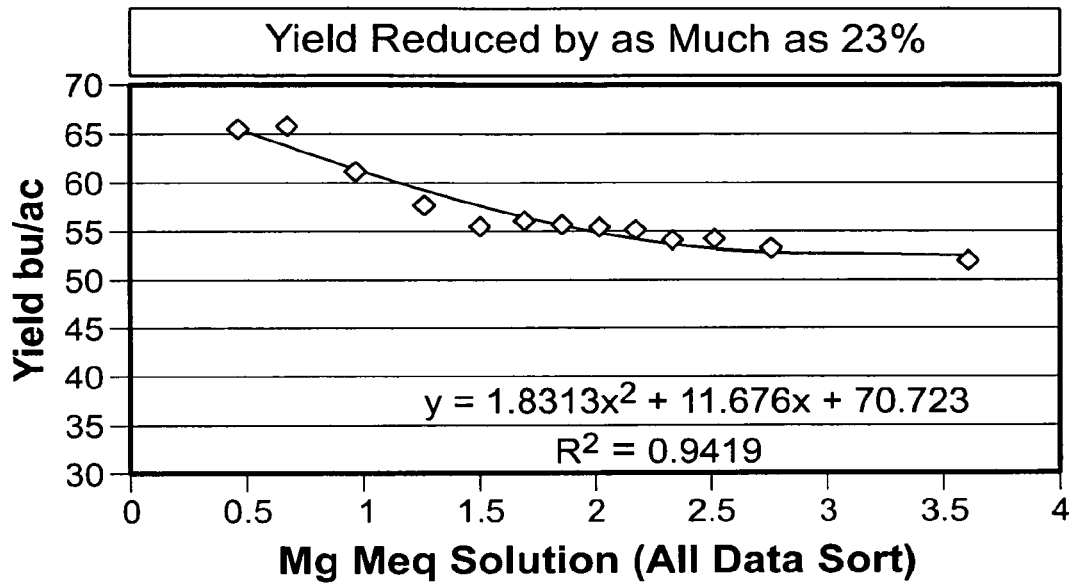
FIGS. 7A, 7B and 7C illustrates a chart of available magnesium versus yield on a variety of crops.
Figure 7B:
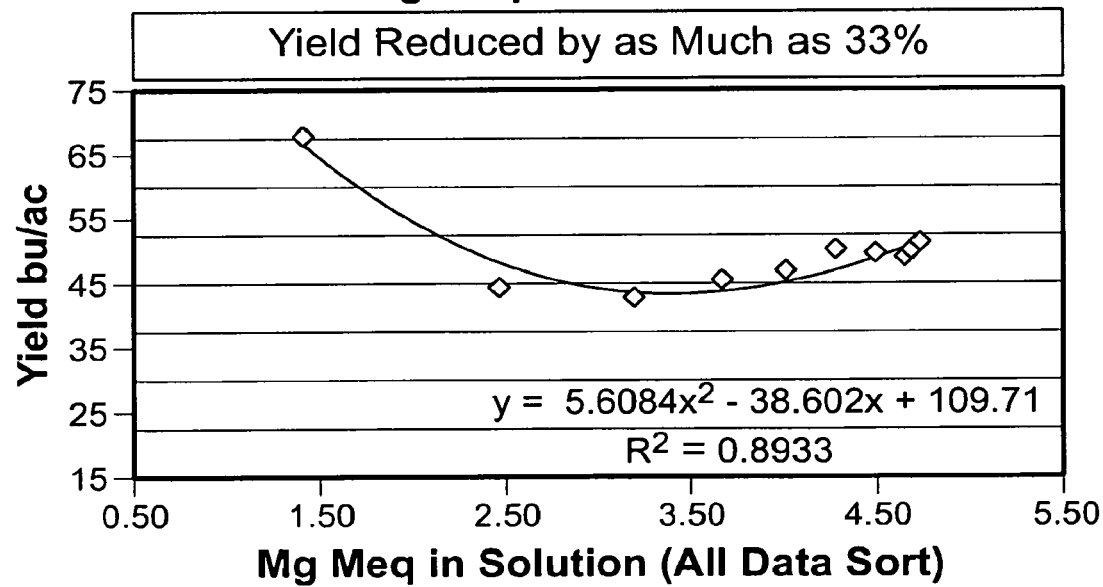
Figure 7C:
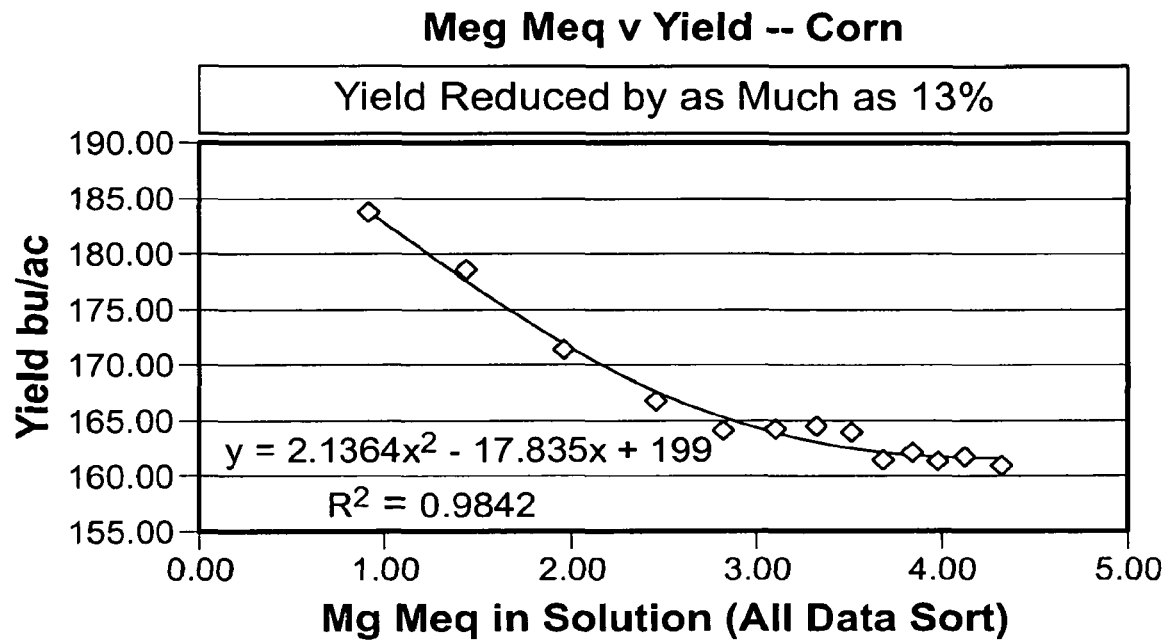

FIGS. 7A, 7B and 7C shows the effect magnesium has on soybeans, wheat, and corn. Overall, magnesium has a negative effect on growth. For example, increased Mg levels reduced soybean yield by as much as 23%. Further, increased levels of Mg resulted in up to a 33% reduction in wheat yield. Additionally, corn yield was reduced by as much as 13%. In this regard, magnesium must remain below 2 meq/L. Thus, this information is factored into the system when determining the treatment recommendation.

Figure 8A:
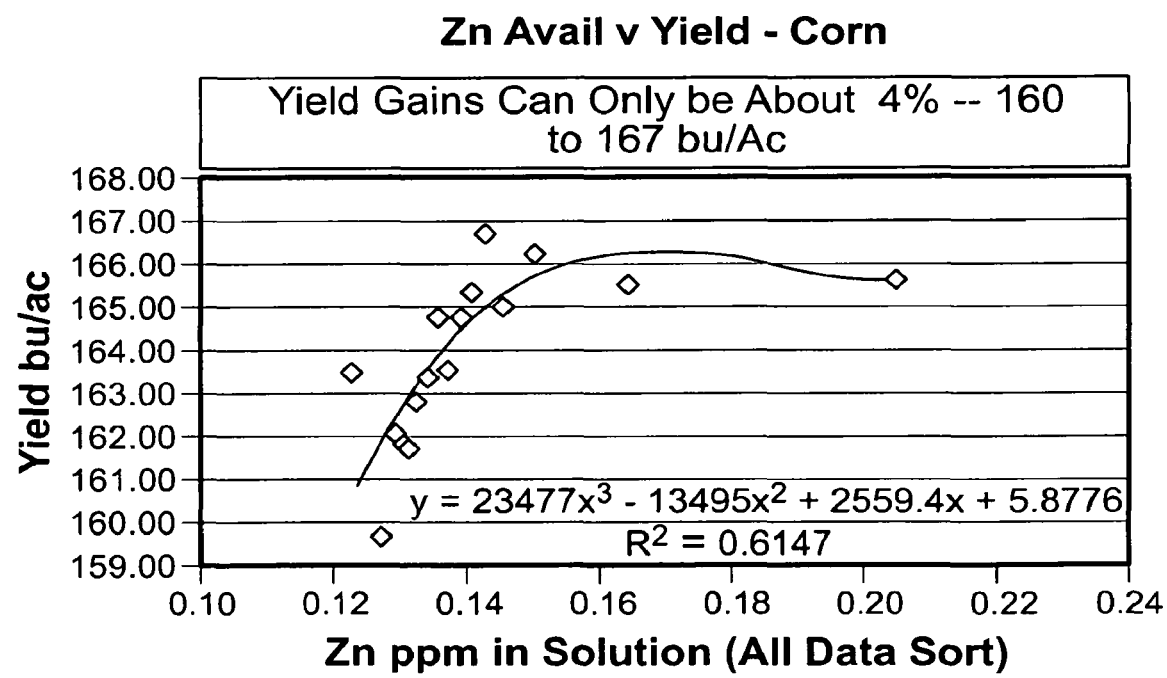
FIGS. 8A, 8B and 8C shows a chart of available zinc versus yield for a variety of crops.
Figure 8B:
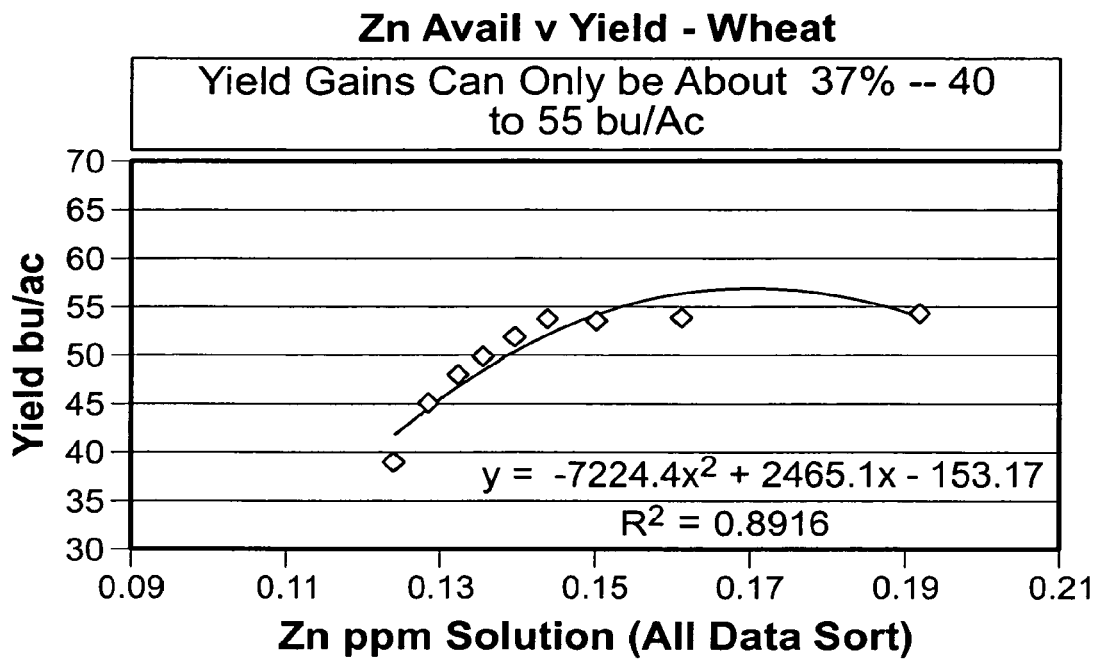
Figure 8C:
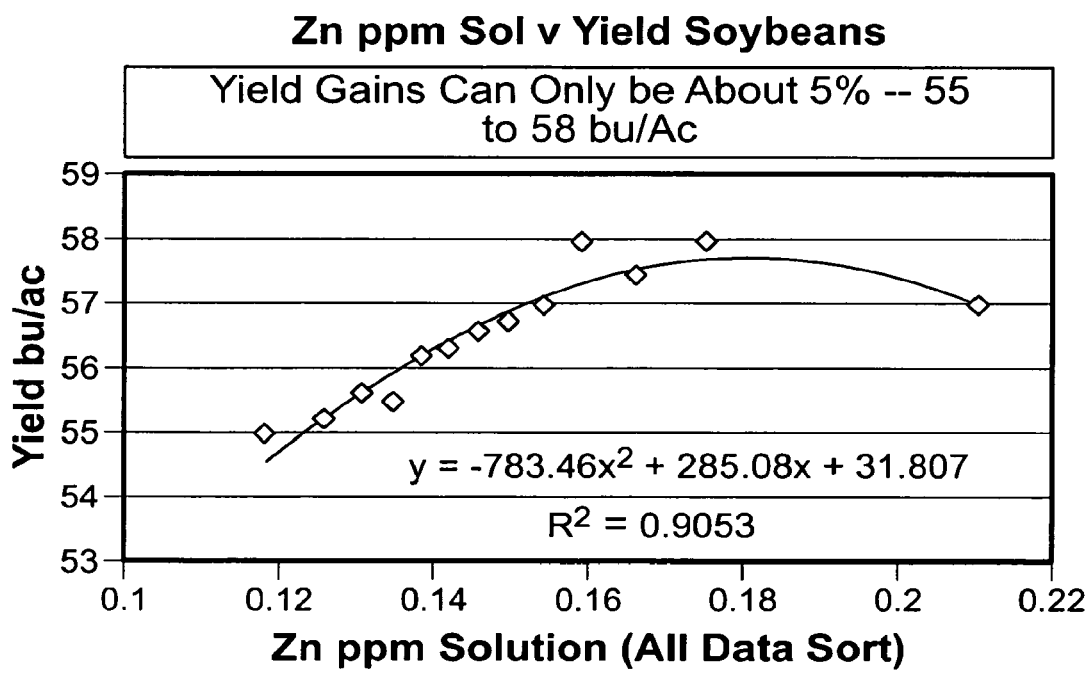

FIGS. 8A, 8B and 8C shows the effect zinc has on crop growth, in particular corn, soybeans, and wheat. In stark contrast to the increased Mg levels discussed with regard to FIGS. 7A, 7B and 7C, FIGS. 8A, 8B and 8C shows increased levels of Zn improved yield for corn, soybeans, and, most significantly, wheat. Therefore, considering increased levels of Zn may be considered for determining the treatment recommendation.

Figure 9A:
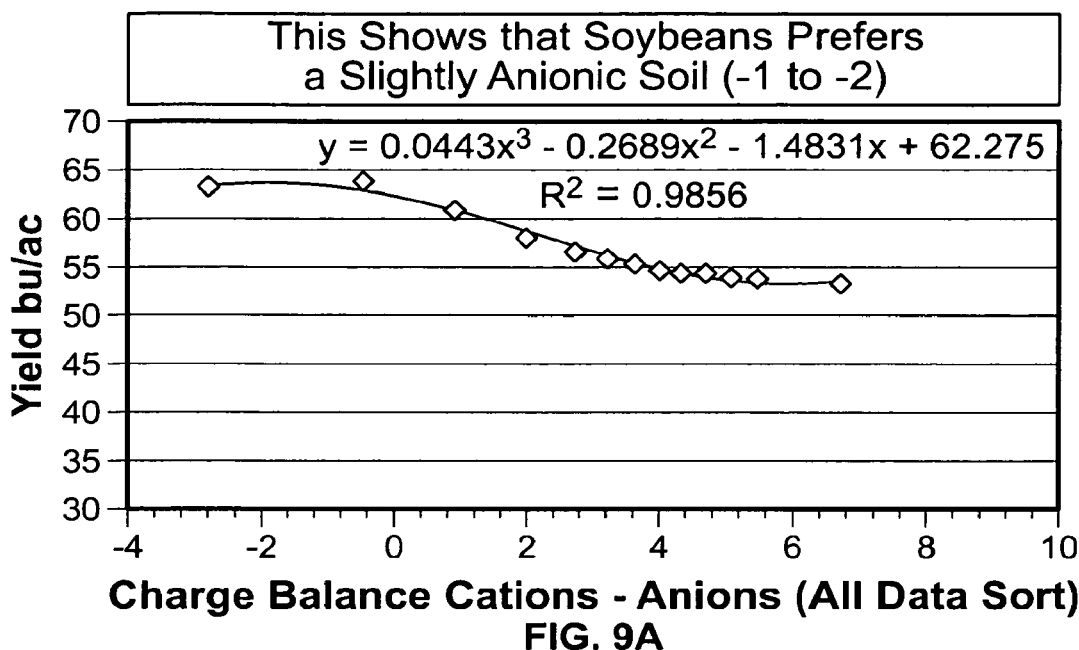
FIGS. 9A, 9B and 9C illustrates charge balance versus yield for several types of crops.
Figure 9B:
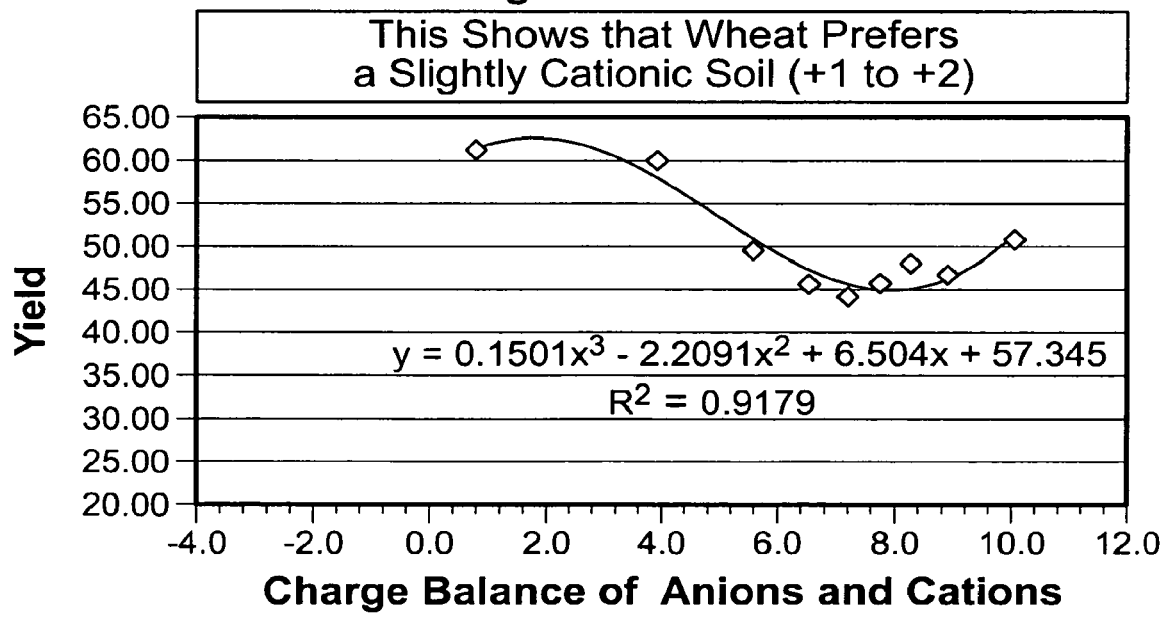
Figure 9C:
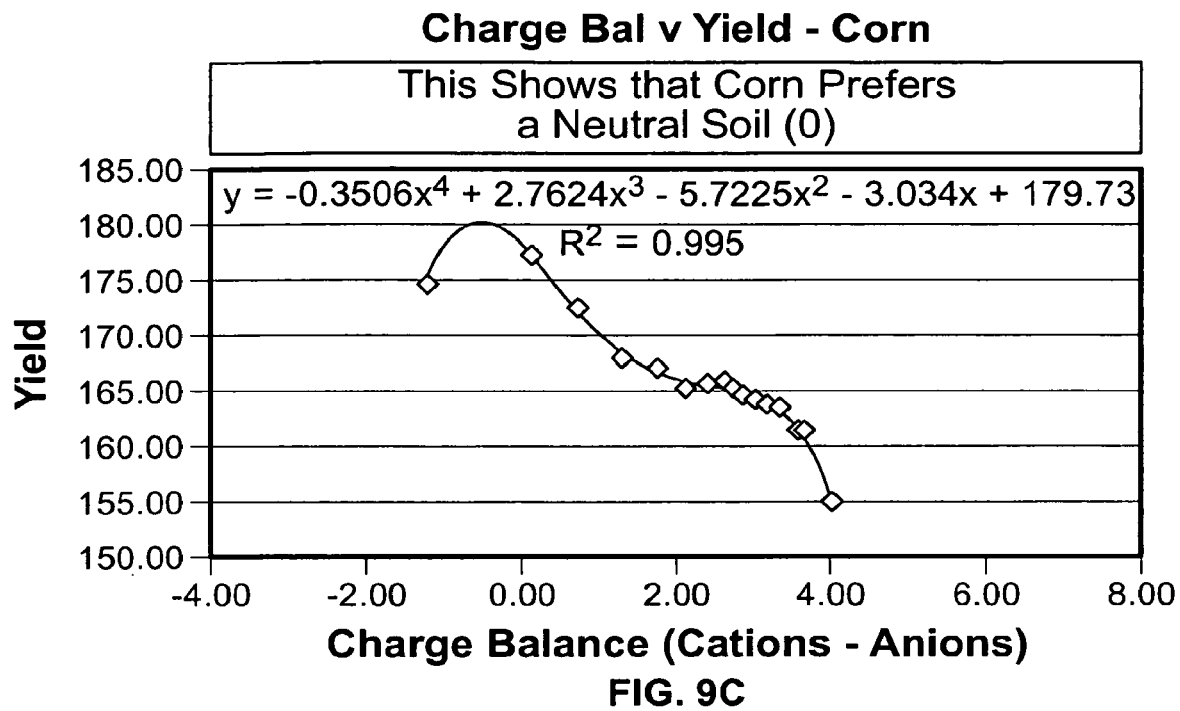

FIGS. 9A, 9B and 9C illustrates the effect of charge balance on crop yield for soybeans, wheat, and corn. In this regard, soybeans were shown to prefer a slightly anionic soil. In contrast, what was shown to prefer a slightly cationic soil corn is shown as having a preference for a neutral soil. This information may be helpful in providing a treatment recommendation. That is, the knowing charge balance of the soil and the crop being grown, the system described herein may provide a recommendation to improve yield based on the charge balance preference of the crops.

Figure 10A:
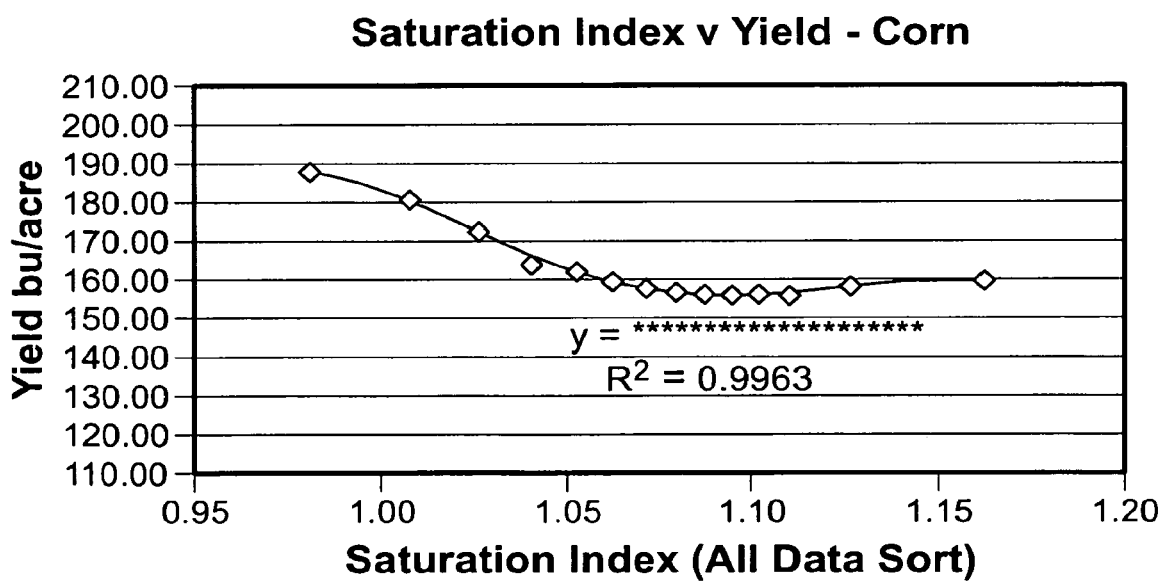
FIGS. 10A, 10B and 10C illustrates a chart showing saturation index versus yield for different crop varietals.
Figure 10B:
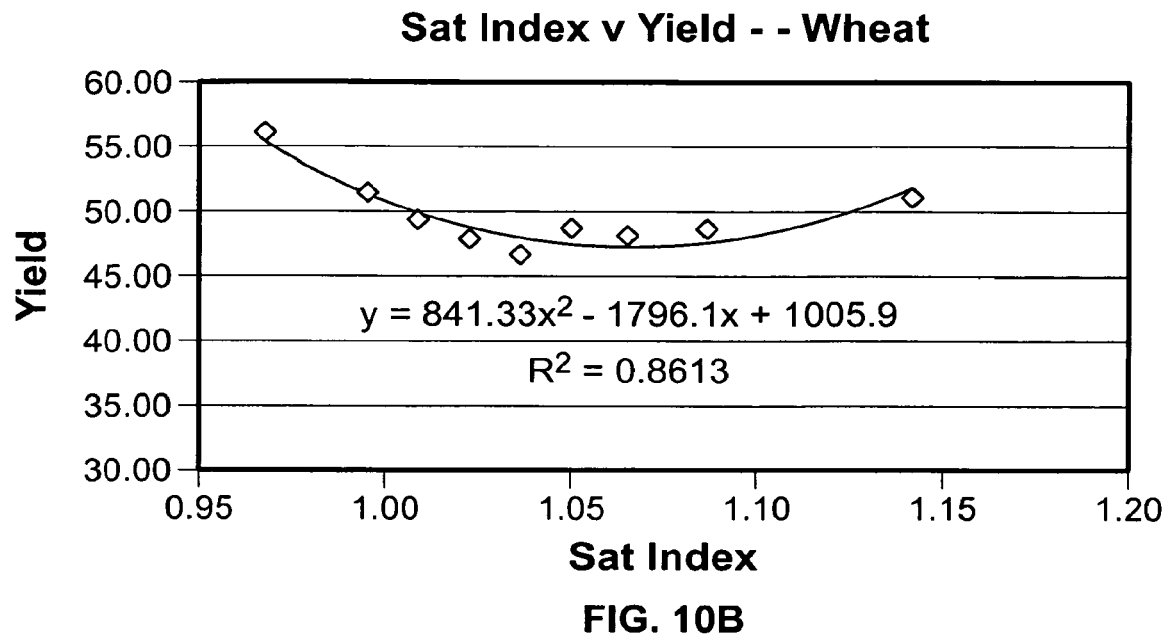
Figure 10C:
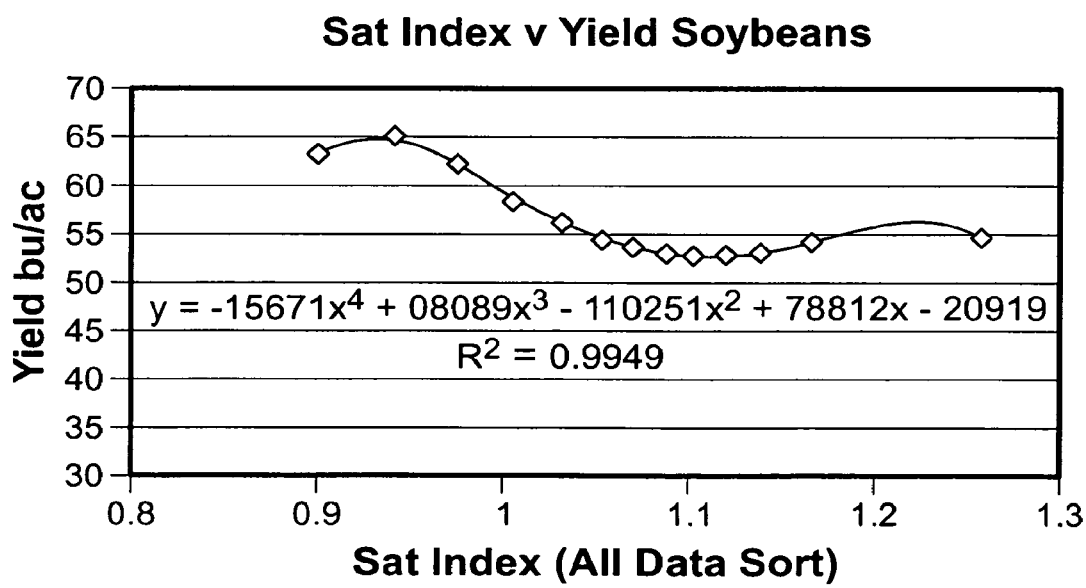

FIGS. 10A, 10B and 10C shows the effect of saturation index on crop yield. While the graphs for each crop have a different shape, all the graphs show that crops prefer a balanced soil. For example, a saturation index between 0.95 to 1.0 having both capillary space and air space was shown to be ideal for improving yield for corn, wheat, and soybeans. Heavy soils were shown to be detrimental. Thus, the system and method described herein may factor in the saturation index and the type of crop to optimize crop yield.

The processors and servers of the present technology utilize all or some of the data provided in FIGS. 3A-11(C) to calculate potential yields and optimal nutrient values for the potential yields of various agricultural crops. The processors and servers are configured to calculate treatment recommendations based on mathematical manipulations of the raw data. When raw data received from upstream servers in the system is compared to known values of a given parameter, the processors and servers can adjust the raw data values in comparison to the known values in order to determine an optimal treatment protocol. The treatment protocol may be based on one two or any combination of data variables. Exemplary data variables can be found in the attached figures. However, the present technology may also rely on other data to compute soil treatment recommendations.

In a preferred embodiment, one or more soil samples are taken and analyzed by a system as described herein. The soil sample may be specific to a specific agricultural crop type (e.g. example, corn, almonds, wheat, avocado and soy). However, the present technology is not limited to a specific type of crops, and multiple crops may be analyzed simultaneously.

After the soil sample is obtained, the nutrient levels in the soil are measured and analyzed by one or more processors. At least two types of nutrient analyses are performed. First, the total amount of nutrients in the soil sample is measured. This measurement is taken in accordance with the methods described herein. However, this total measurement does not assess how much of a given nutrient is actually available for the roots of a specific crop type to absorb. Accordingly, the one or more processor of the present technology also estimate the amount of the specific nutrient that is available in solution to be absorbed by the roots of the specific crop type. This estimation is based, at least in part, on the results of a solubility test, as described above. After the total measurement and estimated nutrient solubility data are received by the one or more processors, the system receives the specific agricultural crop type being analyzed. Specific crop types may be stored in a memory of the system. The system is also configured to analyze at least one nutrient per agricultural crop type, and in preferred embodiments, can analyze a plurality of nutrients per agricultural crop type For each specific agricultural crop type, a threshold value is provided for the total measurement. For the same agricultural crop type, a threshold value is provided for the estimate of the amount of nutrient available in solution to be absorbed by the roots. The threshold values are stored in a memory or storage in the system. Threshold values for a plurality of agricultural crop types may be stored in the memory of the system. This enables the system to function for any crop type known to those of skill in the art. Accordingly, the system may be customized to receive any number of threshold values.

After receiving the specific crop type, total measurement of nutrients in the soil, and the estimate of the amount of nutrient available in solution, the system compares these values to their respective threshold values. Based on the comparison, the one more processor of the system can provide a combination recommendation to increase the yield of the particular crop. The combination recommendation may be provided as a display.

The system is configured such that recommendations are based, at least in part, on whether the total measurement falls short of or exceeds the threshold for a specific crop. When a total measurement falls below a threshold, a recommendation to add nutrients foliarly may be generated by the one or more processors. Examples of foliar nutrients may include, but are not limited to FP-747, IRON MAID, KNIFE® PLUS, LARGO®, HIGH FIVE, PHLEX-MAG, ASTRON®, POWER 23-0-0+MO, POWER 24-0-0+MO, PROLIFF-RC, 5.0 CAL, P-48, PAS-PORT, PER "4" MAX, PERK UP, POWER 12-0-12, RENAISSANCE, FLORA-DOX® PRO, POWER 12-6-0, PROTESYN®, POWER 0-0-22, POWER 4-446, VOLATEX™, PK FIGHT® 0-0-28, POWER 0-22-28 and RAIDER PLUS.

When an estimate of the amount of nutrient available in solution falls below a threshold, a recommendation to add nutrients by way of a soil amendment (i.e. fertilizer) may be generated by the one or more processors. Examples of soil amendments include, but are not limited to FP-747, QXY-FLOR, PERVADE, RETAIN PRO, DEFENSE-CUZN, DEFENSE-MAG, DEFENSE-MAN, QUAD K 0-0-45, CALPHLEX®, PHLEX-MAG, PHLEX-MAN, BLACK-OUT, P-48, THATCH BUSTER, TRICAL® 35-SP, FREE 15, SPIKE, FLORADOX® PRO, VOLATEX™, PROPEL, PROTESYN®, MAXIPLEX, TURGOR® and FIGHT'S ON.

The one or more processors or servers of the present technology are also configured to rank the recommendations. For each agricultural crop type, the system may contain profiles for each nutrient and combination recommendation. These profiles, which are stored in a memory of the system, may be ranked by a predetermined priority, in accordance with their importance or criticality to yield. The combination recommendations that are ultimately displayed by the one or more processors may be further based on these predetermined ranking priorities.

Figure 11A:
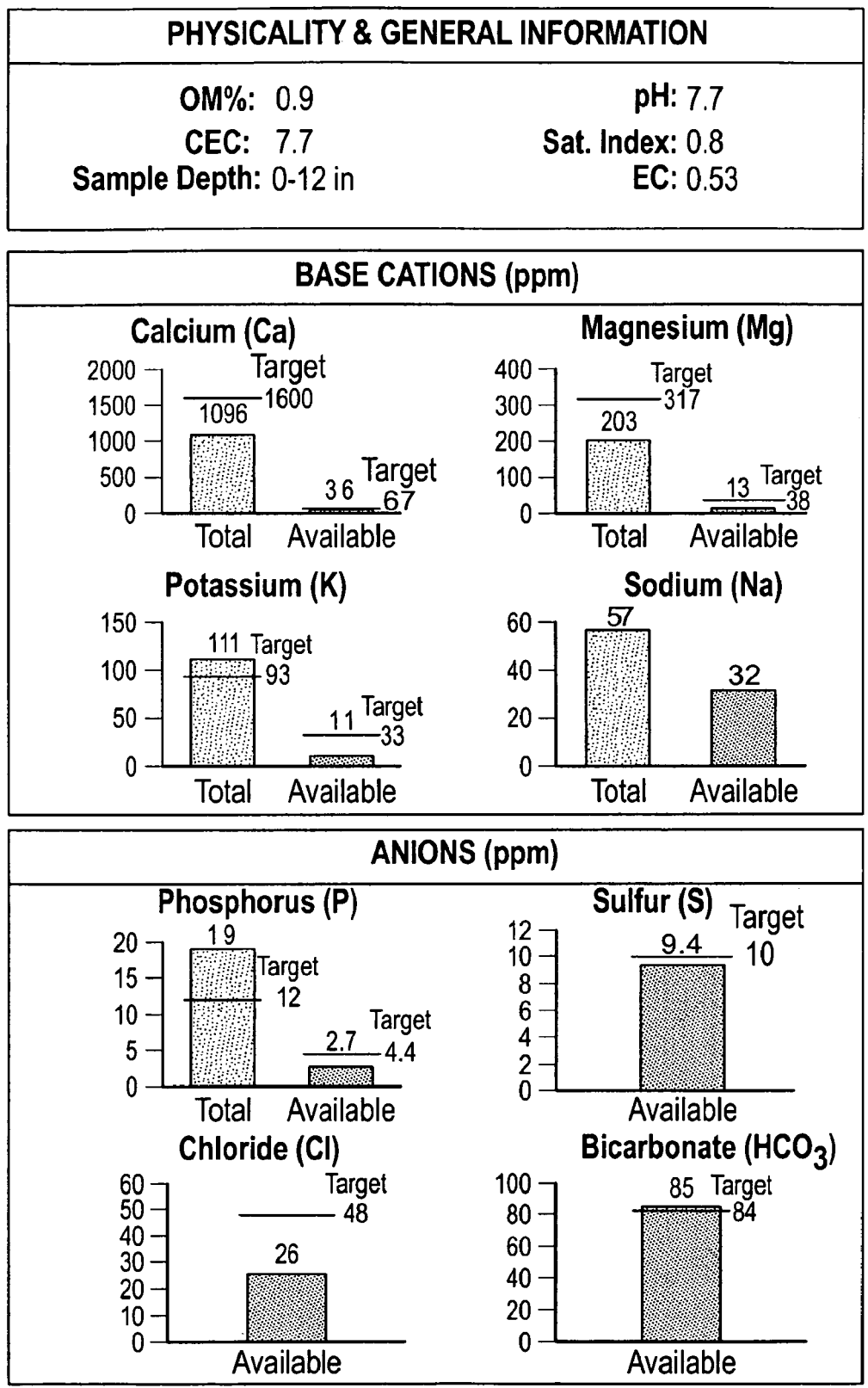
FIG. 11(a) illustrates a page from a display provided by the system.
Figure 11A:
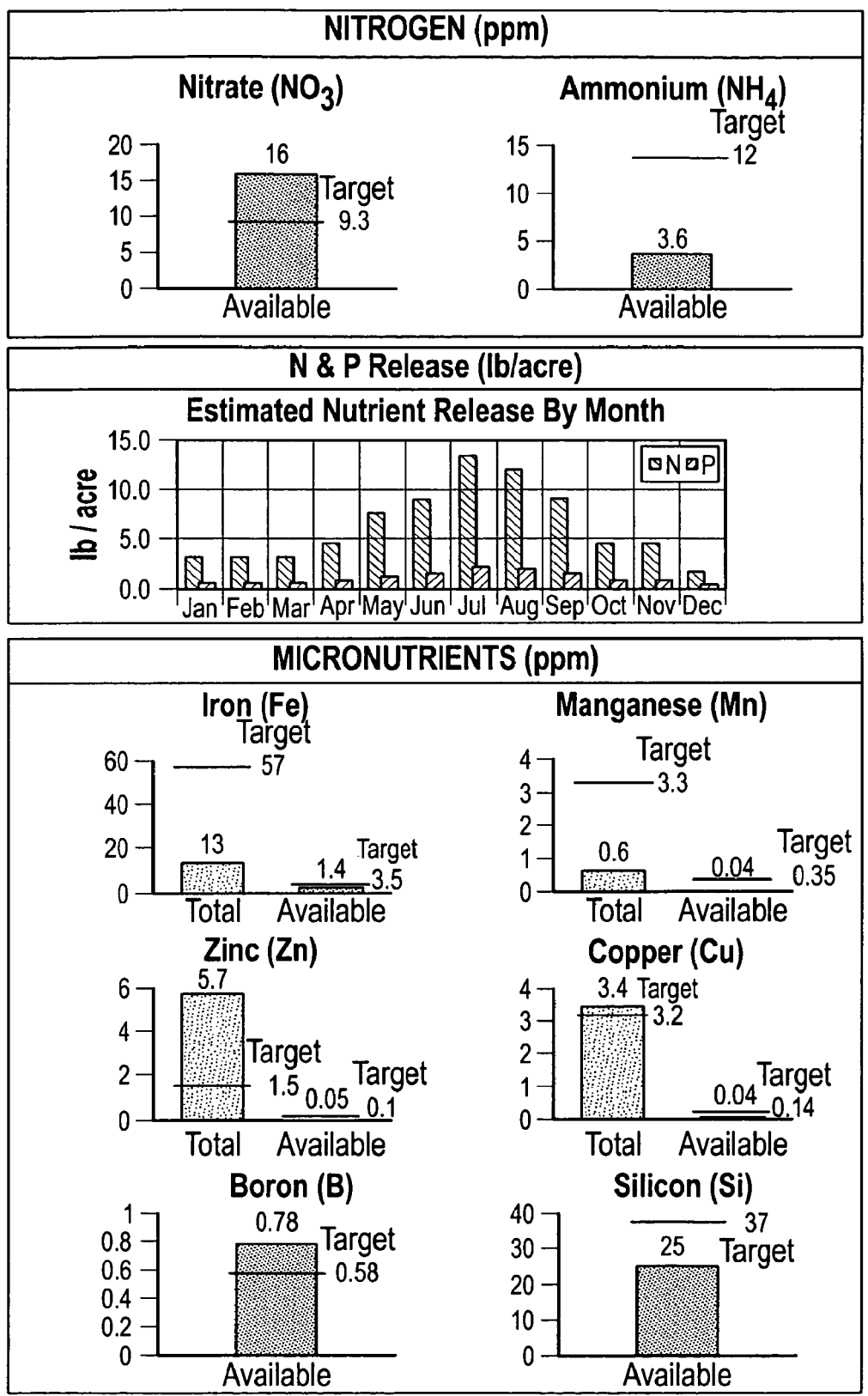
Figure 11B:
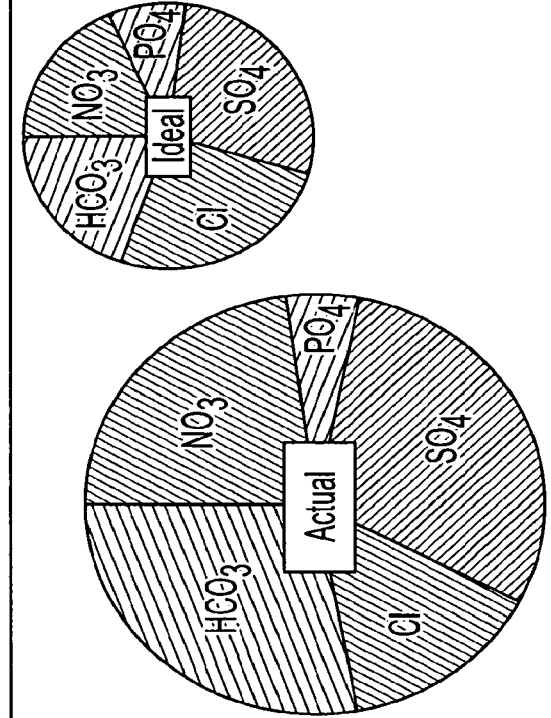
FIG. 11(b) illustrates a page from a display.
Figure 11B:
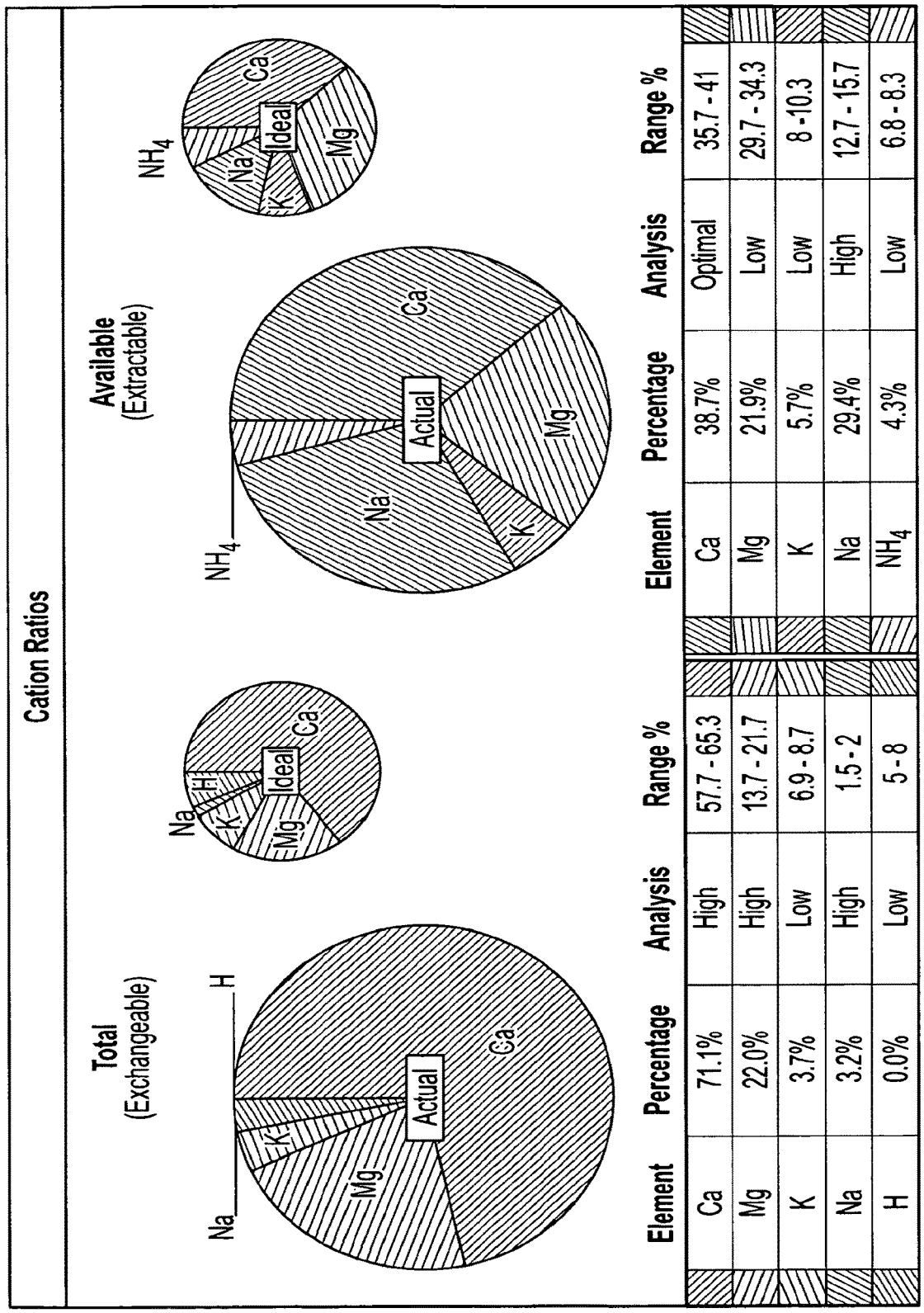

FIGS. 11(a)-11(c) are a representative example of a printed computer display generated by the present system and methods. FIG. 11(a) provides various nutrient information related to a soil sample for an almond crop. In FIG. 11(a), the total measurement of a nutrient contained in the soil sample is designated as "Total" in the display, and the estimate of the amount of nutrient available in solution to be absorbed by the roots of an almond crop is designated as "Available." The sections labeled "base cation," "anions," and "micronutrients" contain the Total and Available values for the various nutrients and micronutrients contained therein. As shown, the system generates a comparison of the Total and Available values, relative to the threshold. In FIGS. 11(a)-(c) the threshold is referred to as the target. The values for these nutrients are measured in ppm. Nitrogen is analyzed separately and only an Available measurement is provided. The Available nitrogen is measured as nitrate ($NO_3$) and ammonium (NH4), in the soil sample. In addition, an estimate of the monthly nitrogen (ENR) and phosphorus release (EPR) is provided in lbs./acre. This is significant as it takes into account predictable nitrogen and phosphorus concentrations over time, in addition to the more static nitrogen and phosphorus shown in. FIG. 11(b). Finally, the physicality and general information for the soil sample is provided. This information includes, but is not limited to Organic Matter (OM) %, Saturation Index, pH, Buffer pH, Soluble Salts, Electrical Conductivity and Excess Carbonates.

Once the system has received the data for the nutrients shown in FIG. 11(a), and made the comparisons between the Total data, Available data, and their respective targets, any deficiencies are ranked in accordance with the predetermined ranking priorities for the agricultural crop type. Those rankings and bulk treatment recommendations are provided in the "Challenges & Solutions" section of FIG. 11(b). Along with the challenge presented by the data and comparisons in FIG. 11(a), a proposed solution is generated by the one or more processors, as are a focus ranking of high, medium and low.

FIG. 11(b) also provides an analysis of the Available anion (e.g. $HCO_3$, $NO_3$, $PO_4$, $SO_4$ and Cl) amounts contained in the soil sample. The system provides an ideal percentage for each of the anions, based on the crop type, in order to maximize yield. These percentages are predetermined and stored in a memory of the system. After the one or more processors receives the actual estimates of the Available anions in the soil sample, the system compares the percentage of the actual anions in the soil, to the ideal values for each of the anions. The one more processors then generates an evaluation regarding whether or not the anion percentage is high, low or optimal, based on the ideal range.

As shown in FIG. 11(b), the system also provides analysis of the cations present in the soil sample. In the embodiment shown in FIG. 11(b), Na, K, H, Ca and Mg are evaluated. For the cation concentrations present in the soil sample, both the Total and Available concentrations are taken. The system then uses the concentrations to calculate a percentage total of each cation in the soil sample. These percentages are then compared to ideal percentages, based on predetermined data stored in the system. The one more processors then generate an evaluation regarding whether or not the anion percentage is high, low or optimal, based on the ideal range.

As shown in FIG. 11(c), the system then generates a final summary of the soil constituents when compared to its target or threshold. The system then generates recommendations for treatment, as shown in the "Bulk Recommendations" section of FIG. 11(c). The Bulk Recommendations are generated in units of lb/acre, however, this could be provided by the system in any unit measurement known in the art. The Bulk Recommendations may be applied by an end user over a specified period of time. By way of example only, the one or more processors may be further configured to recommend the bulk recommendations in one, two or three applications. The one or more processors may generate the recommendation protocol based on factors such as criticality of the nutrient deficiency or excess, as indicated by the system. The system would process these calculations such that the total bulk recommendation for a particular treatment could be accomplished within an acceptable period of time. By way of example only, in FIG. 11(c), 1096 lbs/acre of Calcium is recommended. Based on the results calculated by the system, it may recommend distributing application of exogenous calcium over three separate applications, over a specified time.

In such an embodiment, the system may be programmed with urgency rankings and cost profiles for each recommendation. The urgency rankings and cost profiles would be stored in a non-transitory, computer readable medium and retrieved by the one or more processors of the system at the appropriate time. Based on the urgency, the system may provide three different application options for a specific recommendation (not shown). The system would further be configured such that urgency outweighs cost, in terms of ranking recommendations. In other words, in a certain embodiment, the system would recommend different treatment options, but will always do it within a period of time such that urgency is not sacrificed because of the cost of a treatment. This ranking system programmed into the one or more processors may provide flexibility for applying the recommended bulk and foliar treatments within an acceptable time frame, while reducing cost to the farmer.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for applying a nutrient treatment recommendation to increase yield for a specific agricultural crop comprising:
    transmitting a soil sample for a specific agricultural crop to determine the nutrient treatment recommendation, wherein said nutrient treatment recommendation is determined by receiving, by one or more processors, a total measurement of a nutrient contained in a soil sample from the specific agricultural crop, receiving, by the one or more processors, an estimate of an amount of the nutrient available in solution to be absorbed by roots of the agricultural crop from the soil sample; and receiving by one or more processors a type of the agricultural crops; selecting, by the one or more processors, from a plurality of threshold values a first threshold value for the measurement and a second threshold value for the estimate based on the specific type of the agricultural crop; comparing, by the one or more processors, the measurement to the first threshold value; comparing, by the one or more processors, the estimate to the second threshold value; generating, by the one or more processors, a combination nutrient treatment recommendation to increase yield for the specific agricultural crop based on the comparisons; providing, by the one or more processors, the combination nutrient treatment recommendation for the specific agricultural crop for display;
    receiving the display of the nutrient treatment recommendation; and
    applying the nutrient treatment recommendation to increase yield for a specific agricultural crop.

2. The method of claim 1, wherein when the total measurement of the nutrient is less than the first threshold value, generating the combination recommendation includes generating a recommendation to add nutrients foliarly to the specific agricultural crop.

3. The method of claim 1, wherein when the estimate is less than the first threshold value, generating the combination recommendation includes generating a recommendation to add nutrients to the specific agricultural crop as a soil amendment.

4. The method of claim 1, wherein the nutrient is an anion.

5. The method of claim 4, wherein the anion is selected from the group consisting of phosphorus (P); sulfur (S); chloride (Cl) and bicarbonate ($HCO^-_3$).

6. The method of claim 1, wherein the nutrient is selected from the group consisting of a base cation, nitrogen, and a micronutrient.

7. The method of claim 1, wherein the measurement is received from a sensor system.

8. The method of claim 1, wherein the estimate is received from a sensor system.

9. The method of claim 1, further comprising:
    receiving a second total measurement of a second nutrient contained in the soil sample;
    receiving a second estimate of an amount of the second nutrient available to be absorbed by the roots of the specific agricultural crop, and
    wherein generating the combination nutrient treatment recommendation is further based on the second total measurement and the second estimate.

10. The method of claim 9, further comprising:
    selecting from the plurality of threshold values a third threshold value for the second total measurement and a fourth threshold value for the second estimate, and
    wherein generating the combination nutrient treatment recommendation is further based on a comparison of the third threshold value to the second total measurement and a comparison of the fourth threshold value to the second estimate.

11. The method of claim 10, wherein the combination nutrient treatment recommendation includes a specific recommendation for each of the total measurement, the estimate, the total second measurement, and the second estimate.

12. The method of claim 11 further comprising:
    ranking the specific recommendations based on predetermined ranking priorities for the agricultural crop type, and
    wherein generating the combination nutrient treatment recommendation is further based on the ranking.

13. The method of claim 1, wherein each threshold value of the plurality of threshold values is associated with a particular agricultural crop type such that the plurality of threshold values correspond to a plurality of different agricultural crop types.

14. The method of claim 1, wherein the nutrient treatment is selected from the group consisting of: a bulk application and foliar application.

15. The method of claim 1 wherein the specific agricultural crop is turf.

16. A method for generating a nutrient treatment recommendation to improve turf quality comprising:
    receiving, by one or more processors, a total measurement of a nutrient contained in a soil sample from the turf;
    receiving, by the one or more processors, an estimate of an amount of the nutrient available in solution to be absorbed by roots of the turf from the soil sample;
    receiving by one or more processors a type of the turf;
    selecting, by the one or more processors, from a plurality of threshold values a first threshold value for the measurement and a second threshold value for the estimate based on the type of the turf;
    comparing, by the one or more processors, the measurement to the first threshold value;
    comparing, by the one or more processors, the estimate to the second threshold value;
    generating, by the one or more processors, a combination nutrient treatment recommendation to increase the turf quality based on the comparisons; and
    providing, by the one or more processors, the combination nutrient treatment recommendation for the turf for display.

17. The method of claim 16, wherein the nutrient treatment is selected from the group consisting of: a bulk application and a foliar application.

18. The method of claim 16 further comprising the step of: applying the nutrient treatment recommendation to increase the quality of the turf.

19. The method of claim 16, wherein when the total measurement of the nutrient is less than the first threshold value, generating the combination recommendation includes generating a recommendation to add nutrients foliarly to the turf.

20. The method of claim 16, wherein when the estimate is less than the first threshold value, generating the combination recommendation includes generating a recommendation to add nutrients to the turf as a soil amendment.

* * * * *